United States Patent
Azumi et al.

(10) Patent No.: US 11,194,421 B2
(45) Date of Patent: Dec. 7, 2021

(54) DETECTION DEVICE PERFORMING TOUCH DETECTION AND FINGERPRINT DETECTION

(71) Applicant: Japan Display Inc., Tokyo (JP)

(72) Inventors: Kohei Azumi, Tokyo (JP); Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 3 days.

(21) Appl. No.: 16/829,094

(22) Filed: Mar. 25, 2020

(65) Prior Publication Data
US 2020/0310618 A1    Oct. 1, 2020

(30) Foreign Application Priority Data

Mar. 27, 2019  (JP) .............................. JP2019-061874

(51) Int. Cl.
*G06F 3/041*     (2006.01)
*G06K 9/00*      (2006.01)
*G06F 3/044*     (2006.01)

(52) U.S. Cl.
CPC ........ *G06F 3/04166* (2019.05); *G06F 3/0446* (2019.05); *G06K 9/0002* (2013.01)

(58) Field of Classification Search
CPC .............. G06F 3/04166; G06F 3/0446; G06F 3/041–047; G06K 9/0002; G06K 9/00–0012
See application file for complete search history.

(56) References Cited

U.S. PATENT DOCUMENTS

| | | | | |
|---|---|---|---|---|
| 2008/0158167 | A1* | 7/2008 | Hotelling | G06F 1/3262 345/173 |
| 2011/0025629 | A1* | 2/2011 | Grivna | G06F 3/0446 345/173 |
| 2016/0077667 | A1* | 3/2016 | Chiang | G06F 3/0446 345/173 |
| 2016/0162011 | A1* | 6/2016 | Verma | G06F 3/041661 345/173 |
| 2016/0349907 | A1* | 12/2016 | Kobayashi | G09G 3/3648 |
| 2016/0357320 | A1* | 12/2016 | Ito | G06F 3/04166 |
| 2017/0344174 | A1* | 11/2017 | Pant | G06F 3/0442 |
| 2018/0113558 | A1 | 4/2018 | Cho et al. | |

FOREIGN PATENT DOCUMENTS

JP         2018073421 A    5/2018

* cited by examiner

*Primary Examiner* — Roberto W Flores
(74) *Attorney, Agent, or Firm* — K&L Gates LLP

(57) ABSTRACT

According to an aspect, a detection device includes at least a first touch detection period, in which first touch detection is performed, and a fingerprint detection period, in which fingerprint detection is performed. In the first touch detection period, a plurality of second electrodes in a second detection area in a first detection area are simultaneously selected, a plurality of first electrodes in the first detection area are simultaneously selected, and a first detection signal corresponding to a capacitance change between first electrodes and second electrodes are sequentially output. In the fingerprint detection period, the second electrodes in a plurality of divided areas obtained by dividing a second detection area are sequentially selected, the first electrodes in the divided areas are sequentially selected, and a second detection signal corresponding to a capacitance change between the first electrodes and the second electrodes is output.

11 Claims, 27 Drawing Sheets

| TP | FP1-1 | TP | FP1-2 | TP | FP1-3 | TP | FP1-4 | TP | FP1-1 |

FIG.13
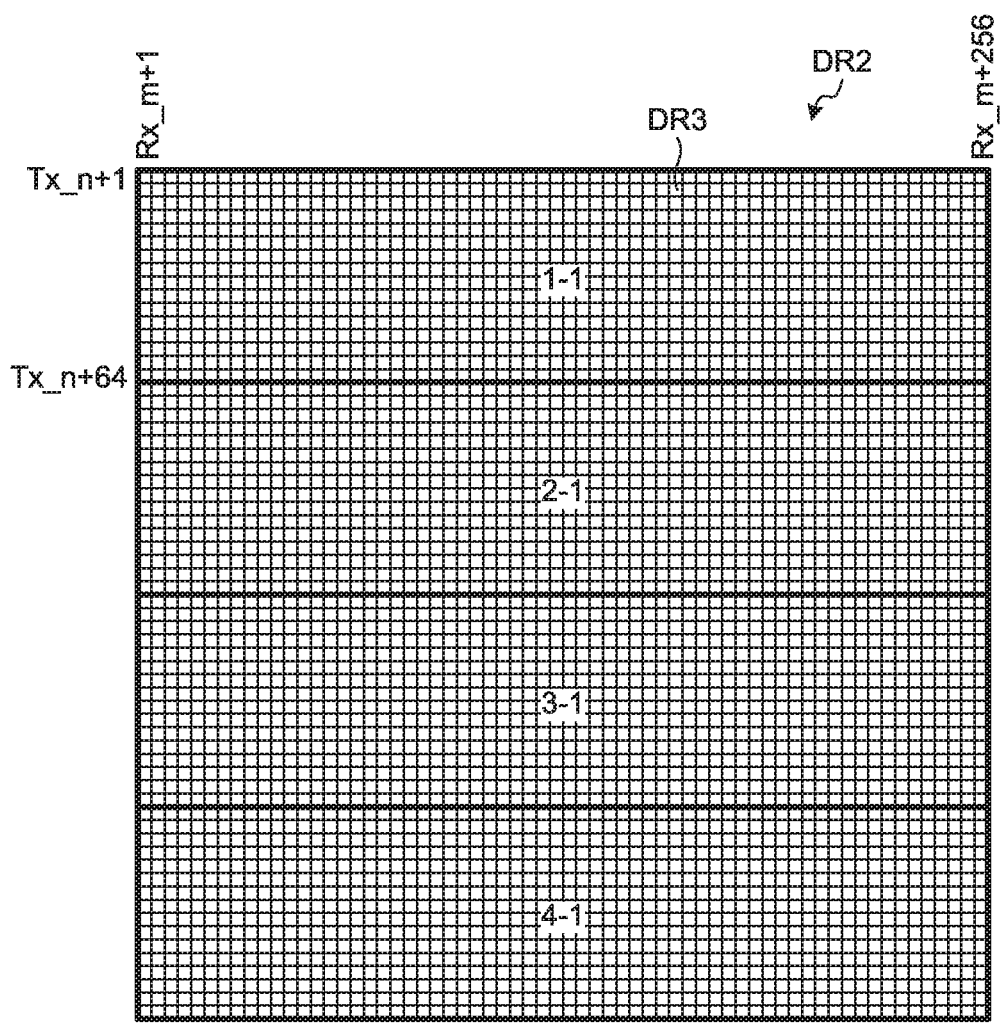
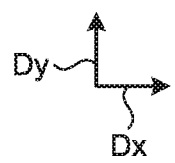

FIG.17
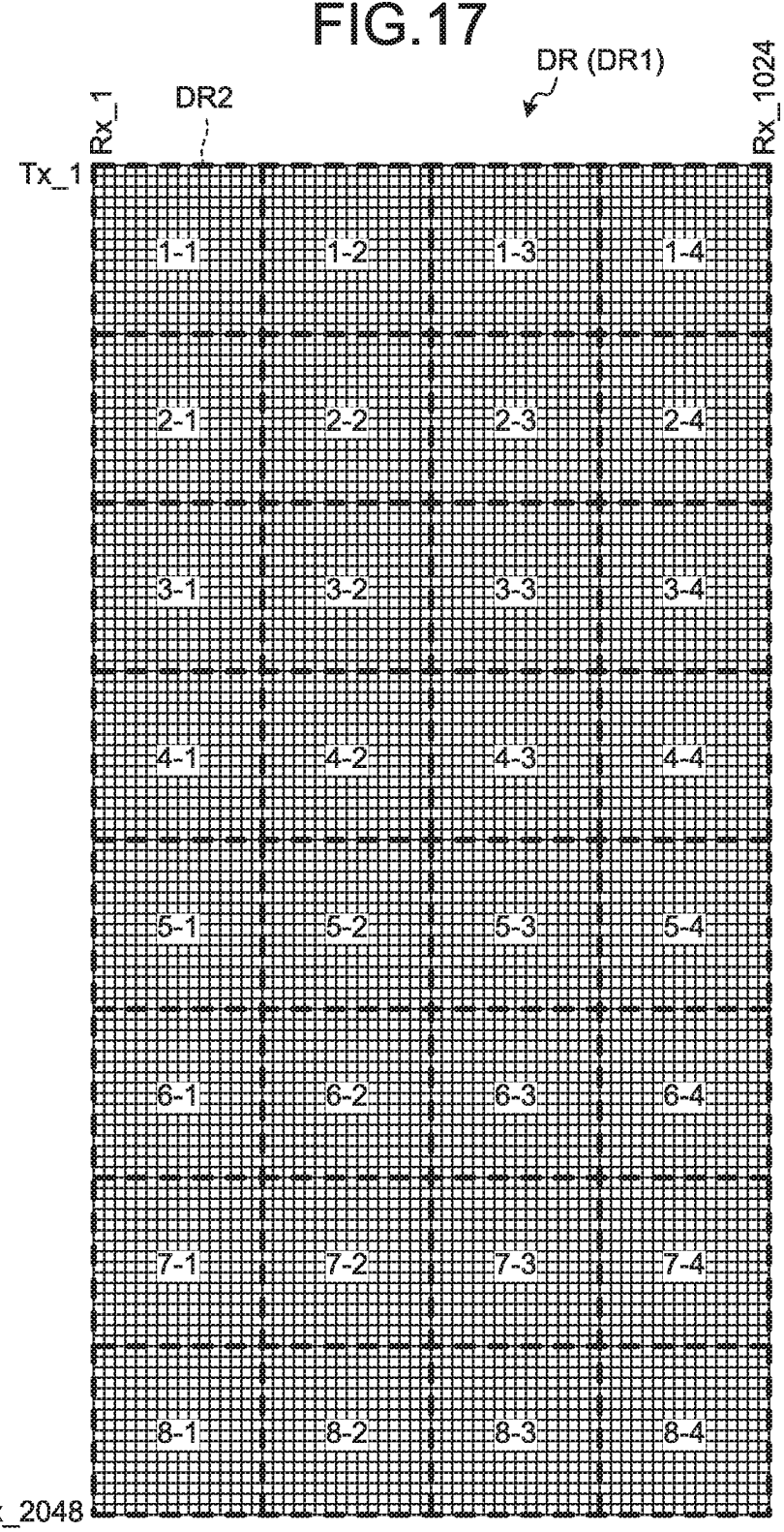
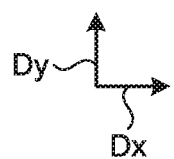

FIG.21

| SELF | TP | SELF | SELF | TP | SELF | SELF | TP | SELF | SELF | TP | SELF | SELF | TP | SELF |

DETECTION DEVICE PERFORMING TOUCH DETECTION AND FINGERPRINT DETECTION

CROSS-REFERENCE TO RELATED APPLICATIONS

This application claims priority from Japanese Application No. 2019-061874, filed on Mar. 27, 2019, the contents of which are incorporated by reference herein in its entirety.

BACKGROUND

1. Technical Field

The preset invention relates to a detection device.

2. Description of the Related Art

In recent years, a detection device, or a so-called touch panel, which can detect an external proximity has been provided with a fingerprint sensor in some cases. The fingerprint sensor detects a capacitance change corresponding to a recess or protrusion of a fingerprint to detect the shape of a fingerprint of a finger that has come into contact with a detection device. Japanese Patent Application Laid-open Publication No. 2018-73421, for example, discloses a configuration having a touch area performing touch detection and a fingerprint-and-touch area performing both touch detection and fingerprint detection.

In recent years, a configuration that can perform fingerprint detection at a freely-selected position within a detection area, on which touch detection is performed, has been demanded.

For the foregoing reasons, there is a need for a detection device that can perform fingerprint detection at a freely-selected position within a detection area, on which touch detection is performed.

SUMMARY

According to an aspect, a detection device includes: a plurality of first electrodes provided in a first area and arranged in a first direction; a plurality of second electrodes provided in the first area and arranged in a second direction intersecting the first direction; a first electrode selection circuit configured to select the first electrodes; a second electrode selection circuit configured to select the second electrodes; a detector configured to detect a capacitance generated in the first electrodes or the second electrodes; and a controller configured to control the first electrode selection circuit, the second electrode selection circuit, and the detector. The second electrode selection circuit is configured to: in a first period, simultaneously select the second electrodes provided in the first area; and in a second period, sequentially select the second electrodes provided in one of a plurality of third areas obtained by dividing a second area within the first area. The first electrode selection circuit is configured to: in the first period, simultaneously select the first electrodes within the first area and sequentially output a first detection signal corresponding to a capacitance change between the first electrodes and the second electrodes; and in the second period, sequentially select the first electrodes within the third area and output a second detection signal corresponding to a capacitance change between the first electrodes and the second electrodes in the second period. The controller has at least the first period and the second period provided alternately.

BRIEF DESCRIPTION OF THE DRAWINGS

FIG. 10 is an exemplary detection timing chart in the touch/fingerprint detection mode of the first division example of the second detection area illustrated in FIG. 9;

FIG. 12 is an exemplary detection timing chart in the touch/fingerprint detection mode of the second division example of the second detection area illustrated in FIG. 11;

FIG. 13 is a schematic diagram of a third division example enlarging the second detection area illustrated in FIG. 8;

FIG. 14 is an exemplary detection timing chart in the touch/fingerprint detection mode of the third division example of the second detection area illustrated in FIG. 13;

FIG. 16 is an exemplary detection timing chart in the touch/fingerprint detection mode of the fourth division example of the first detection area illustrated in FIG. 15;

FIG. 17 is a schematic diagram of the second detection area in the touch/fingerprint detection mode of the detection device according to a second embodiment;

FIG. 21 is an exemplary detection timing chart in a first power-saving mode of the detection device according to a first modification of the third embodiment;

FIG. 23 is an exemplary detection timing chart in the second power-saving mode of the detection device according to the second modification of the third embodiment;

FIG. 26 is an exemplary detection timing chart in the second power-saving mode of the detection device according to the fourth modification of the third embodiment;

DETAILED DESCRIPTION

Figure 1:
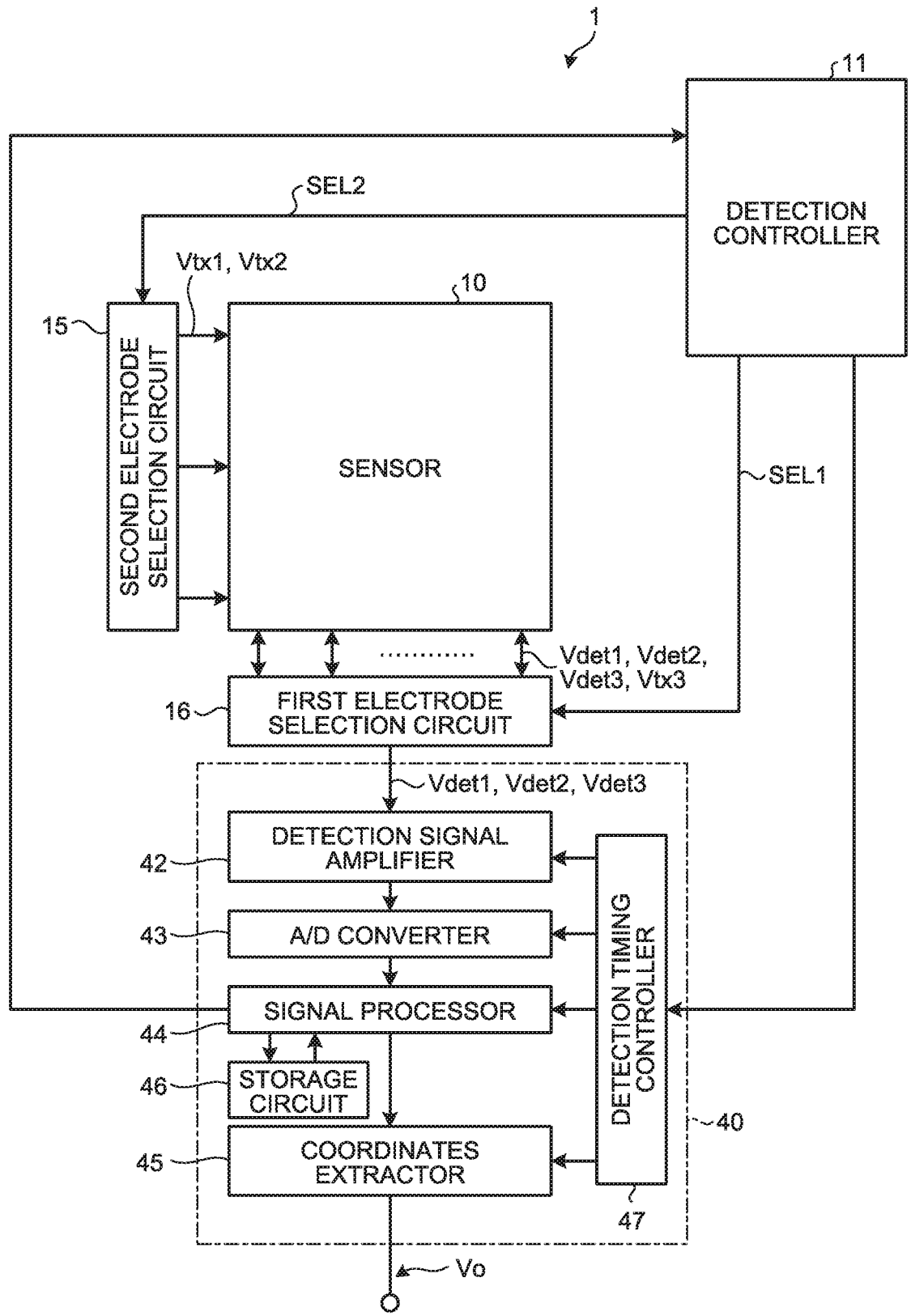
FIG. 1 is a block diagram of a configuration example of a detection device according to a first embodiment.

Exemplary aspects (embodiments) according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below can be appropriately combined. The disclosure is given by way of example only, and various changes made without departing from the spirit of the disclosure and easily conceivable by those skilled in the art are naturally included in the scope of the disclosure. The drawings may possibly illustrate the width, the thickness, the shape, and the like of each unit more schematically than the actual aspect to simplify the explanation. These elements, however, are given by way of example only and are not intended to limit interpretation of the disclosure. In the specification and the figures, components similar to those previously described with reference to a preceding figure are denoted by like reference numerals, and detailed explanation thereof will be appropriately omitted. In this disclosure, when an element A is described as being "on" another element B, the element A can be directly on the other element B, or there can be one or more elements between the element A and the other element B.

First Embodiment

FIG. 1 is a block diagram of a configuration example of a detection device according to a first embodiment. The following first describes a configuration of this detection device 1 according to the first embodiment and an outline of operations of respective components.

As illustrated in FIG. 1, the detection device 1 includes a sensor 10, a detection controller (a controller) 11, a second electrode selection circuit 15, a first electrode selection circuit 16, and a detector 40.

The detection device 1 detects an object to be detected such as a finger being in contact with or proximity to the sensor 10 based on the detection principle of a mutual capacitance system (hereinafter, referred to as "first touch detection"). The detection device 1 detects an object to be detected such as a finger being in contact with or proximity to the sensor 10 based on the detection principle of a self-capacitance system (hereinafter, referred to as "second touch detection"). The detection device 1 detects a recess or protrusion on the surface of an object to be detected such as a finger being in contact with or proximity to the sensor 10 to detect a fingerprint based on the detection principle of the mutual capacitance system (hereinafter, referred to as "fingerprint detection").

In a mutual capacitance system-based or self-capacitance system-based touch detection operation, a state in which a capacitance change by the object to be detected being in contact or proximity occurs will hereinafter be referred to as a "touch state", whereas a state in which the capacitance change by the object to be detected being in contact or proximity does not occur will hereinafter be referred to as a "non-touch state".

The detection controller 11 is a circuit supplying a control signal each to the second electrode selection circuit 15, the first electrode selection circuit 16, and the detector 40 to control operations thereof.

The second electrode selection circuit 15 is a switch circuit (a multiplexer) selecting a second electrode Tx (refer to FIG. 2) based on a second electrode selection signal SEL2 supplied from the detection controller 11. The second electrode selection circuit 15 supplies a first drive signal Vtx1 or a second drive signal Vtx2 to the selected second electrode Tx.

The first electrode selection circuit 16 is a switch circuit (a multiplexer) selecting a first electrode Rx (refer to FIG. 2) based on a first electrode selection signal SEL1 supplied from the detection controller 11. The first electrode selection circuit 16 supplies a third drive signal Vtx3 to the selected first electrode Rx. The first electrode selection circuit 16 outputs a first detection signal Vdet1, a second detection signal Vdet2, or a third detection signal Vdet3 from the selected first electrode Rx to the detector 40.

Details of a mutual capacitance system-based touch detection operation, a mutual capacitance system-based fingerprint detection operation, and a self-capacitance system-based touch detection operation will be described below with reference to FIG. 5 to FIG. 14. As another aspect, a configuration may be employed, in which the second electrode selection circuit 15 supplies the third drive signal Vtx3 to the selected second electrode Tx and outputs the third detection signal Vdet3 from the selected second electrode Tx to the detector 40.

The detector 40 is a circuit performing touch detection by detecting a capacitance generated in the first electrode Rx or the second electrode Tx based on the control signal supplied from the detection controller 11 and the first detection signal Vdet1 or the third detection signal Vdet3 supplied from the sensor 10. The detector 40 is a circuit performing the fingerprint detection by detecting a capacitance generated in the first electrode Rx based on the control signal supplied from the detection controller 11 and the second detection signal Vdet2 supplied from the sensor 10.

The detector 40 includes a detection signal amplifier 42, an A/D converter 43, a signal processor 44, a coordinates extractor 45, a storage circuit 46, and a detection timing controller 47. The detection timing controller 47 performs control such that the detection signal amplifier 42, the A/D converter 43, the signal processor 44, and the coordinates extractor 45 operate in synchronization with each other based on the control signal supplied from the detection controller 11. In the following description, when there is no need to separately describe the first detection signal Vdet1, the second detection signal Vdet2, and the third detection signal Vdet3, they will be represented simply as a detection signal Vdet.

The detection signal amplifier 42 amplifies the detection signal Vdet (the first detection signal Vdet1, the second detection signal Vdet2, or the third detection signal Vdet3).

The detection signal amplifier 42 includes an integrating circuit or a voltage detector converting fluctuations in current generated in the first electrode Rx in accordance with a drive signal into fluctuations in voltage, for example. The A/D converter 43 converts an analog signal output from the detection signal amplifier 42 into a digital signal to generate detection data Vd (a detection value).

The storage circuit 46 stores the detection data Vd of the A/D converter 43 in the non-touch state to each part of the sensor 10 as baseline data (a reference value) Vb. The baseline data Vb is updated as appropriate by the signal processor 44. The storage circuit 46 may be a random access memory (RAM), a read only memory (ROM), and a register circuit, for example.

The signal processor 44 is a logic circuit detecting the presence or absence of touch on the sensor 10 or a fingerprint based on an output signal of the A/D converter 43. The signal processor 44, based on the detection data Vd acquired from the A/D converter 43 and the baseline data Vb stored in the storage circuit 46, calculates differential data Vs as a signal component caused by the touch state and the non-touch state to each part of the sensor 10 included in the detection data Vd. Specifically, the signal processor 44 calculates the differential data Vs (=Vd−Vb) between the detection data Vd acquired from the A/D converter 43 and the baseline data Vb stored in the storage circuit 46.

The signal processor 44 holds a threshold Vt determining the touch state and the non-touch state to each part of the sensor 10. The signal processor 44 compares the calculated differential data Vs with the threshold Vt for each part of the sensor 10. When the differential data Vs is the threshold Vt or less (Vs≤Vt), the signal processor 44 determines that the part of the sensor 10 is in the non-touch state. When the differential data Vs is greater than the threshold Vt, the signal processor 44 determines that the part of the sensor 10 is in the touch state.

The signal processor 44 sets an area including the part of the sensor 10 determined to be the touch state as a touch state detection area. The signal processor 44 sets the touch state detection area as an area for coordinates calculation, which is a target of touch coordinates calculation processing by the subsequent coordinates extractor 45, and outputs the area for coordinates calculation and the differential data Vs in each part of the sensor 10 included in this area for coordinates calculation to the coordinates extractor 45.

When determining that each part of the sensor 10 is in the non-touch state, the signal processor 44 updates the baseline data (the reference value) Vb in the sensor 10 with the value of the detection data (the detection value) Vd in the part of the sensor 10 at this moment. The baseline data (the reference value) Vb is updated as appropriate, whereby even a case in which the baseline data (the reference value) Vb in the non-touch state has deviated by changes in an operating environment or the like can be addressed, and thus accurate touch detection or fingerprint detection can be performed.

The coordinates extractor 45 is a logic circuit determining a touch position or fingerprint detection coordinates based on a computation processing result by the signal processor 44.

The coordinates extractor 45 analyzes the distribution status of each part of the sensor 10 indicating the touch state and determines the touch position or the fingerprint detection coordinates using the differential data Vs in each part of the sensor 10 included in the area for coordinates calculation output from the signal processor 44. The coordinates extractor 45 outputs the presence or absence of touch and the touch position or the fingerprint detection coordinates as output Vo.

Figure 2:
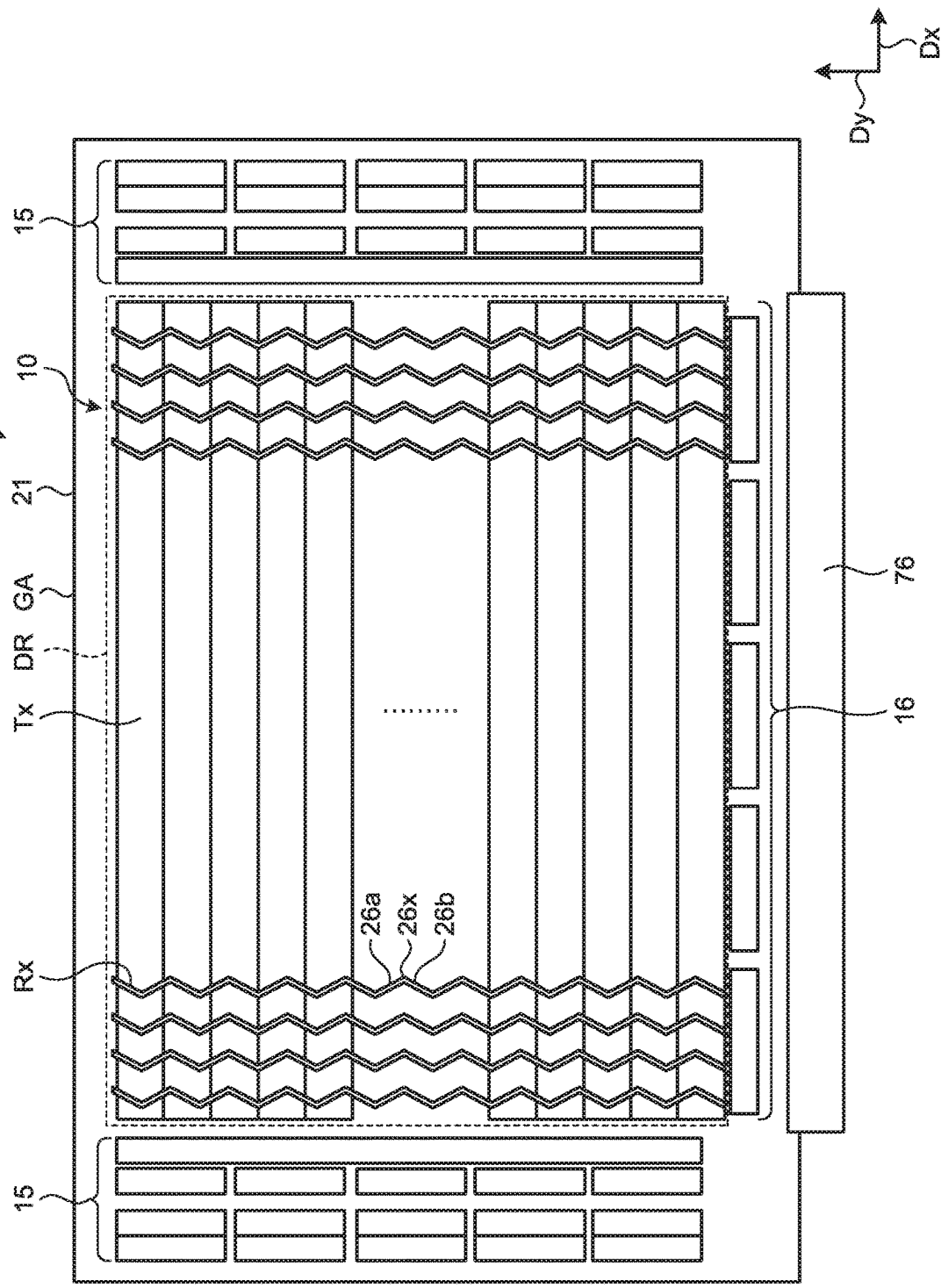
FIG. 2 is a plan view of the detection device according to the first embodiment.
Figure 3:
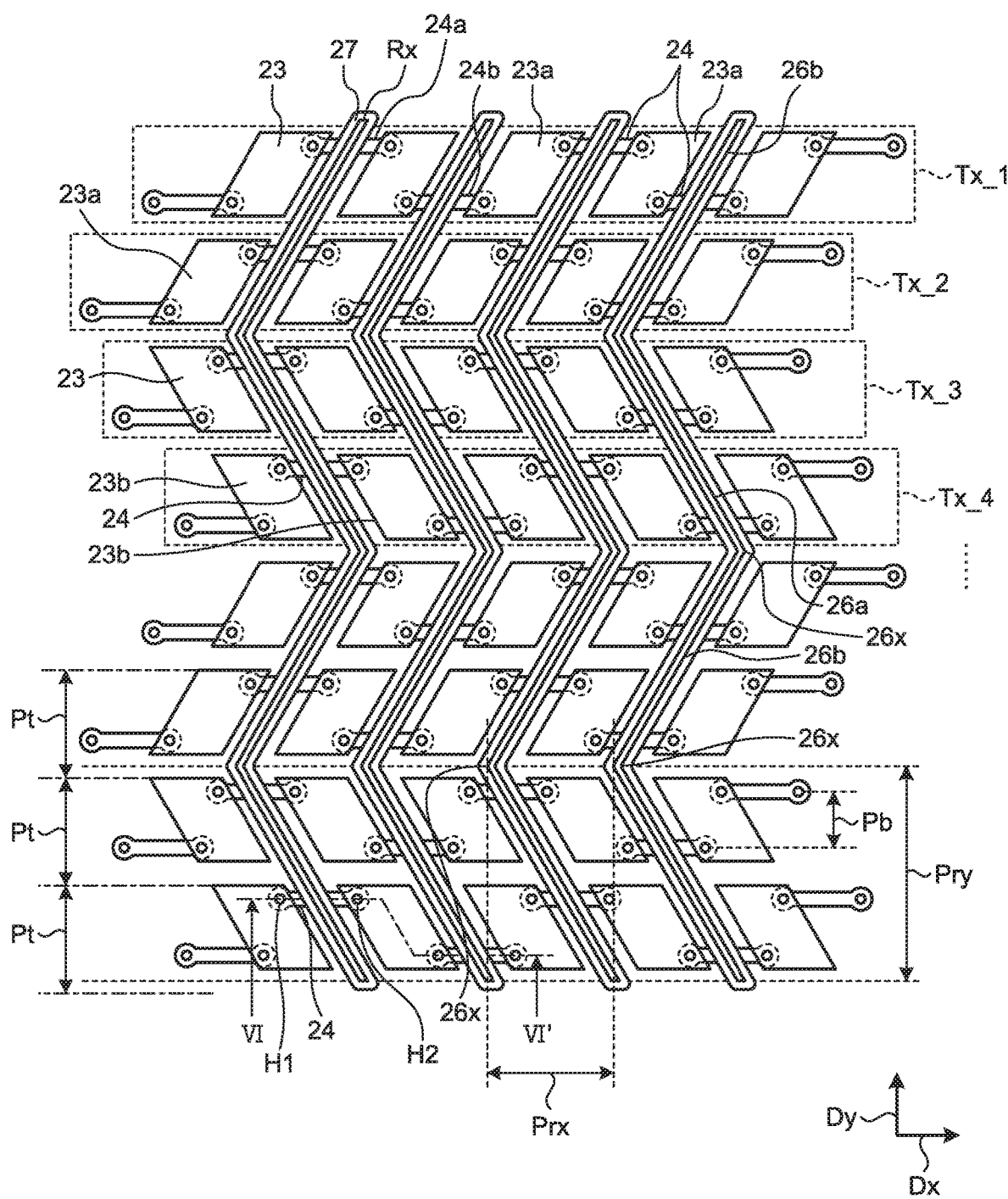
FIG. 3 is a plan view of a configuration example of a sensor.
Figure 4:
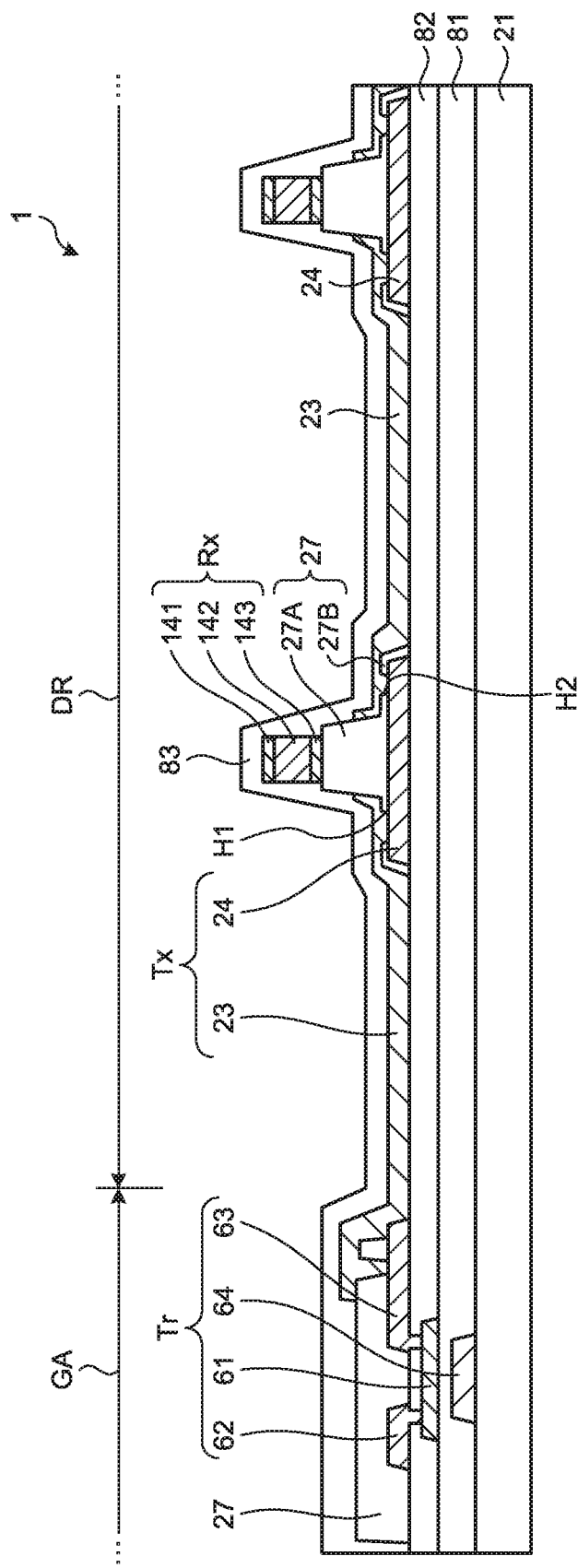
FIG. 4 is a sectional view of the configuration example of the sensor.

The following describes configurations of the first electrode Rx and the second electrode Tx of the detection device 1. FIG. 2 is a plan view of the detection device according to the first embodiment. FIG. 3 is a plan view of a configuration example of the sensor. FIG. 4 is a sectional view of the configuration example of the sensor.

As illustrated in FIG. 2, the detection device 1 includes a sensor substrate 21 (a first substrate) and a plurality of first electrodes Rx and second electrodes Tx provided on the sensor substrate 21. The sensor substrate 21 is a substrate having translucency allowing visible light to pass therethrough, and is a glass substrate, for example. The sensor substrate 21 may be a translucent resin substrate or a resin film formed of resin such as polyimide. The sensor 10 is a sensor having translucency.

The second electrodes Tx extend in a first direction Dx and are arranged in a second direction Dy. The first electrodes Rx extend in a second direction Dy and are arranged in the first direction Dx. The first electrodes Rx may extend in the second direction Dy in a zigzag manner and are arranged in the first direction Dx. The first electrodes Rx extend in a direction intersecting the second electrodes Tx in a plan view. The first electrodes Rx are each coupled to a flexible print circuit board 76 provided in a frame area GA of the sensor substrate 21 via frame wiring (not illustrated). The first electrodes Rx and the second electrodes Tx are provided in a detection area DR. The second electrodes Tx are formed of a translucent conductive material such as indium tin oxide (ITO). The first electrodes Rx are formed of a metallic material such as aluminum or an aluminum alloy. The second electrodes Tx may be formed of a metallic material, whereas the first electrodes Rx may be formed of ITO. When the first electrodes Rx are formed of a metallic material, resistance associated with the detection signal Vdet can be reduced.

The first direction Dx is an in-plane direction parallel to the sensor substrate 21 and is a direction parallel to one side of the detection area DR, for example. The second direction Dy is an in-plane direction parallel to the sensor substrate 21 and is a direction orthogonal to the first direction Dx. The second direction Dy may intersect the first direction Dx without being orthogonal thereto. In the present specification, "a plan view" indicates a case when viewed in a direction perpendicular to the sensor substrate 21. FIG. 2 illustrates a configuration in which a side of the detection area DR extending in the first direction Dx is longer than a side thereof extending in the second direction Dy, but a configuration may be employed, in which the side of the detection area DR extending in the first direction Dx is shorter than the side thereof extending in the second direction Dy.

Intersecting parts between the first electrodes Rx and the second electrodes Tx each form a capacitance.

When the mutual capacitance system-based first touch detection operation is performed in the sensor 10, the second electrode selection circuit 15 selects a plurality of second electrodes Tx and simultaneously supplies the first drive signal Vtx1 to the selected second electrodes Tx. The first electrode selection circuit 16 selects a plurality of first electrodes Rx, and the first detection signal Vdet1 corresponding to the capacitance change by the object to be detected being in contact or proximity is output to the detector 40 from the selected first electrodes Rx. With this operation, the mutual capacitance system-based first touch detection is performed. As described in detail below, the selected second electrodes Tx are bundled and driven as one second electrode group TTx in the first touch detection. Similarly, the selected first electrodes Rx are bundled and driven as one first electrode group RRx in the first touch detection.

When the mutual capacitance system-based fingerprint detection operation is performed in the sensor 10, the second electrode selection circuit 15 selects the second electrodes Tx and simultaneously supplies the second drive signal Vtx2 to the selected second electrodes Tx. The first electrode selection circuit 16 selects the first electrodes Rx, and the second detection signal Vdet2 corresponding to a capacitance difference by the recess or protrusion on the surface of the object to be detected is output to the detector 40 from the selected first electrodes Rx. With this operation, the mutual capacitance system-based fingerprint detection is performed.

When the self-capacitance system-based second touch detection operation is performed in the sensor 10, the first electrode selection circuit 16 simultaneously supplies the third drive signal Vtx3 to all the first electrodes Rx of the sensor 10. The first electrode selection circuit 16 simultaneously outputs the third detection signal Vdet3 corresponding to the capacitance change by the object to be detected being in contact or proximity from all the first electrodes Rx of the sensor 10. With this operation, the self-capacitance system-based second touch detection is performed.

While the second electrode selection circuit 15 and the first electrode selection circuit 16 are provided in the frame area GA of the sensor substrate 21 in FIG. 2, this is a mere example. The second electrode selection circuit 15 and the first electrode selection circuit 16 are not necessarily included in the sensor substrate 21, and at least part of various kinds of circuits including the second electrode selection circuit 15 and the first electrode selection circuit 16 may be included in an integrated circuit (IC) for detection mounted on the flexible print circuit board 76. Alternatively, at least part of the various kinds of circuits may be provided in an external control substrate. The second electrode selection circuit 15 may be one semiconductor integrated circuit (IC).

The following describes configurations of the second electrode Tx and the first electrode Rx. As illustrated in FIG. 3, the first electrode Rx is formed as a zigzag line, and a longitudinal direction of the first electrode Rx as a whole is the second direction Dy. The first electrode Rx has a plurality of first straight line parts 26a, a plurality of second straight line parts 26b, and a plurality of bent parts 26x, for example. A second straight line parts 26b extends in a direction intersecting a first straight line part 26a. A bent part 26x couples the first straight line part 26a and the second straight line part 26b to each other.

The first straight line part 26a extends in a direction intersecting the first direction Dx and the second direction Dy. The second straight line part 26b also extends in a direction intersecting the first direction Dx and the second direction Dy. The first straight line part 26a and the second straight line part 26b are arranged so as to be symmetrical about a virtual line (not illustrated) parallel to the first direction Dx. In the first electrode Rx, the first straight line part 26a and the second straight line part 26b are alternately coupled to each other in the second direction Dy.

In each of the first electrodes Rx, a pitch of the bent parts 26x in the second direction Dy is set to Pry. Between adjacent first electrodes Rx, a pitch of the bent parts 26x in the first direction Dx is set to Prx. In the present embodiment, a magnitude relation of Prx<Pry is preferable, for example. The first electrodes Rx may have another shape such as a wavy shape or a linear shape.

As illustrated in FIG. 3, a plurality of second electrodes Tx_1, Tx_2, Tx_3, Tx_4, . . . each have a plurality of electrode parts 23 and a plurality of coupling parts (connection parts) 24. In the following description, when there is no need to separately describe the second electrodes Tx_1, Tx_2, Tx_3, Tx_4, . . . , they will be represented simply as a second electrode Tx.

The second electrodes Tx_1 and Tx_2, which intersect the second straight line part 26b of the first electrode Rx, include first electrode parts 23a each having two sides parallel to the second straight line part 26b as the electrode parts 23. The second electrodes Tx_3 and Tx_4, which intersect the first straight line part 26a of the first electrode Rx, include second electrode parts 23b each having two sides parallel to the first straight line part 26a as the electrode parts 23. That is to say, the electrode parts 23 are arranged along the first electrode Rx. In other words, the first electrode Rx and the electrode parts 23 are arranged such that a separation distance between the first electrode Rx and the electrode parts 23 is constant in a plan view. The number of the second electrode parts 23b corresponding to one first straight line part 26a or the number of the first electrode parts 23a corresponding to one second straight line part 26b may be one or an integer of 3 or more.

In the second electrodes Tx_1 and Tx_2, the electrode parts 23 are arranged in the first direction Dx and are arranged spaced apart from each other. In each of the second electrodes Tx, the coupling parts 24 each couple adjacent electrode parts 23 among the electrode parts 23 to each other. In a plan view, each of the first electrodes Rx intersects the coupling parts 24 through the adjacent electrode parts 23. The second electrodes Tx_3 and Tx_4 also have a similar configuration. The first electrode Rx is a metallic thin line, and the width of the first electrode Rx in the first direction Dx is smaller than the width of the electrode parts 23 in the first direction Dx. This configuration reduces an area in which the second electrode Tx and the first electrode Rx overlap with each other, enabling reduction of a parasitic capacitance. The coupling part 24 included in one second electrode Tx has a first coupling part (first connection part) 24a and a second coupling part (second connection part) 24b. The position of the second coupling part 24b in the second direction Dy is different from the position of the first coupling part 24a in the second direction Dy. The first coupling part 24a and the second coupling part 24b are alternately arranged.

A pitch of the second electrodes Tx in the second direction Dy is set to Pt. The pitch Pt is about ½ of the pitch Pry of the bent parts 26x of the first electrode Rx. The present discloser is not limited to this example, and the pitch Pt may be 1/n (n is an integer of 1 or more) of the pitch Pry. The pitch Pt is 50 μm or more and 100 μm or less, for example. In one second electrode Tx, the coupling parts 24 adjacent to each other in the first direction Dx are arranged in a staggered manner at a pitch Pb in the second direction Dy. Each of the first electrode part 23a and the second electrode part 23b is parallelogram-shaped, but may be rectangular-shaped, polygonal-shaped, or odd-shaped. Each of the first electrode part 23a and the second electrode part 23b may include, for example, a third electrode part that is arranged between adjacent bent parts 26x and having a polygonal shape in which a first part having two sides parallel to the first straight line part 26a and a second part having two sides parallel to the second straight line part 26b are coupled to each other. In other words, the number of the electrode parts 23 adjacent to a partial structure consisting of one first straight line part 26a, one second straight line part 26b, and the bent part 26x coupling them to each other is not limited to an even number and may be an odd number.

The following describes a layered structure of the detection device 1 with reference to FIG. 4. In FIG. 4, a cross section of the frame area GA is a cross section obtained by cutting a part including a thin film transistor Tr included in the second electrode selection circuit 15. FIG. 4 illustrates a relation between a layered structure of the detection area DR and a layered structure of the frame area GA by schematically connecting a cross section along the VI-VI' line of the detection area DR and the cross section of the part including the thin film transistor Tr of the frame area GA.

As illustrated in FIG. 4, the detection device 1 is provided with the thin film transistor Tr in the frame area GA. The thin film transistor Tr includes a semiconductor layer 61, a source electrode 62, a drain electrode 63, and a gate electrode 64. The gate electrode 64 is provided on the sensor substrate 21. A first inter-layer insulating film 81 is provided on the sensor substrate 21 to cover the gate electrode 64. For the material of the gate electrode 64, aluminum (Al), copper (Cu), silver (Ag), molybdenum (Mo), or an alloy of these is used. For the material of the first inter-layer insulating film 81, a silicon oxide film (SiO), a silicon nitride film (SiN), or a silicon oxide nitride film (SiON) is used. The first inter-layer insulating film 81 is not limited to a single layer and may be a film with a multilayered structure. The first inter-layer insulating film 81 may be a film with a multilayered structure in which a silicon nitride film is formed on a silicon oxide film, for example.

The semiconductor layer 61 is provided on the first inter-layer insulating film 81. A second inter-layer insulating film 82 is provided on the first inter-layer insulating film 81 to cover the semiconductor layer 61. The semiconductor layer 61 is exposed at the bottom of a contact hole provided in the second inter-layer insulating film 82. For the material of the semiconductor layer 61, polysilicon or an oxide semiconductor is used, for example. For the material of the second inter-layer insulating film 82, a silicon oxide film, a silicon nitride film, or a silicon oxide nitride film is used. The second inter-layer insulating film 82 is not limited to a single layer and may be a film with a multilayered structure. The second inter-layer insulating film 82 may be a film with a multilayered structure in which a silicon nitride film is formed on a silicon oxide film, for example.

The source electrode 62 and the drain electrode 63 are provided on the second inter-layer insulating film 82. The source electrode 62 and the drain electrode 63 are coupled to the semiconductor layer 61 via respective contact holes provided in the second inter-layer insulating film 82. For the material of the source electrode 62, the drain electrode 63, and the coupling parts 24, titanium aluminum (TiAl) as an alloy of titanium and aluminum is used.

Further, an insulating resin layer 27, the second electrode part 23b of the second electrode Tx, and the coupling part 24 are provided on the second inter-layer insulating film 82. The resin layer 27 provided in the frame area GA covers the source electrode 62 and the drain electrode 63. The drain electrode 63 is electrically coupled to the second electrode Tx via a contact hole provided in the resin layer 27 provided in the frame area GA.

The resin layer 27 provided in the detection area DR has a first resin layer 27A and a second resin layer 27B as a film thinner than the first resin layer 27A. The first resin layer 27A covers a part positioned immediately below the first electrode Rx on the coupling part 24. The second resin layer 27B provided in the detection area DR covers a part positioned immediately below the electrode part 23 on the coupling part 24.

The second resin layer 27B is provided with contact holes H1 and H2. In the detection area DR, a peripheral part of the electrode part 23 is coupled to the coupling part 24 via the contact holes H1 and H2. In this example, the electrode part 23 is in contact with the second inter-layer insulating film 82.

The first electrode Rx is provided on the first resin layer 27A. The first electrode Rx has a first metal layer 141, a second metal layer 142, and a third metal layer 143, for example. The second metal layer 142 is provided on the third metal layer 143, and the first metal layer 141 is provided on the second metal layer 142. For the material of the first metal layer 141 and the third metal layer 143, molybdenum or a molybdenum alloy is used, for example. For the material of the second metal layer 142, aluminum or an aluminum alloy is used. Molybdenum or a molybdenum alloy included in the first metal layer 141 is lower in the reflectivity of visible light than aluminum or an aluminum alloy included in the second metal layer 142. With this configuration, the first electrode Rx can be made invisible.

An insulating film 83 is provided on the resin layer 27, the electrode part 23, and the first electrode Rx. The insulating film 83 covers a top face and side faces of the first electrode Rx. For the insulating film 83, a film with a high refractive index and a low reflectance such as a silicon nitride film is used.

With the foregoing configuration, the first electrode Rx and the second electrode Tx are formed on the same sensor substrate 21. The first electrode Rx and the second electrode Tx are provided as different layers via the resin layer 27 as an insulating layer. The first electrode Rx and the second electrode Tx may be formed as the same conductive layer and may be coupled with different conductive layers via an insulating layer only at the area in which the first electrode Rx and the second electrode Tx intersect each other.

Figure 5:
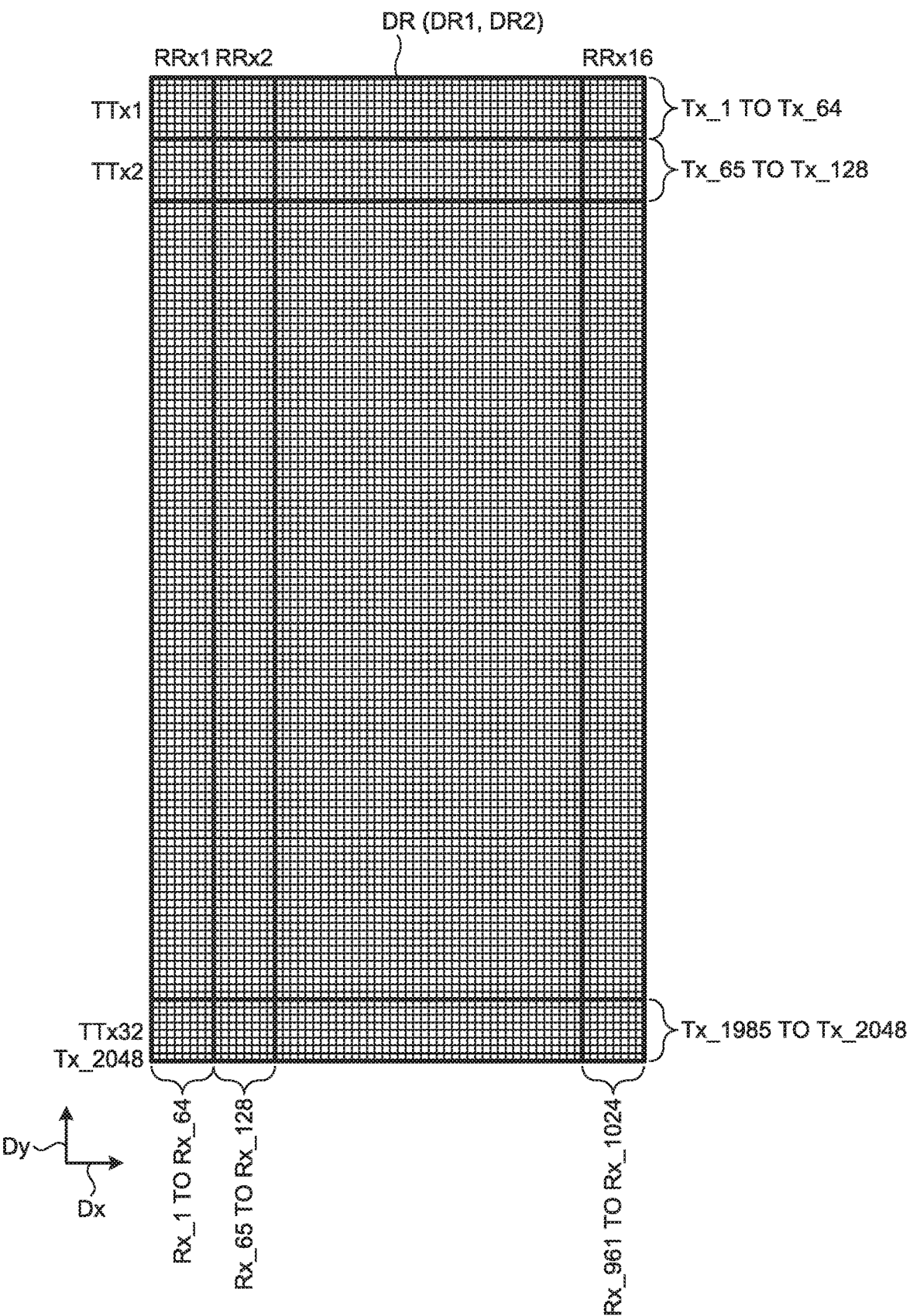
FIG. 5 is a schematic diagram of a first detection area of the detection device according to the first embodiment.

The following describes detection areas and various kinds of detection modes in the detection device 1. FIG. 5 is a plan view of a first detection area of the detection device according to the first embodiment. FIG. 5 illustrates an example in which in the detection area DR 1,024 first electrodes Rx are arranged in the first direction Dx, whereas 2,048 second electrodes Tx are arranged in the second direction Dy. In FIG. 5, a grid square indicates the intersecting part between the first electrode Rx and the second electrode Tx.

In the present embodiment, the mutual capacitance system-based first touch detection is performed with the entire area of the detection area DR as a first detection area (a first area) DR1, whereas the mutual capacitance system-based fingerprint detection is performed with at least part of the detection area DR as a second detection area (a second area) DR2.

Specifically, when the first touch detection is performed, the second electrode selection circuit 15 selects a plurality of second electrodes Tx within the first detection area (the first area) DR1 based on the second electrode selection signal SEL2 supplied from the detection controller 11 and simultaneously supplies the first drive signal Vtx1 to the selected second electrodes Tx. In the example illustrated in FIG. 5, 64 second electrodes Tx obtained by 32-way division of the first detection area DR1 in the second direction Dy are bundled as one second electrode group TTx, and the first drive signal Vtx1 is sequentially supplied to a plurality of second electrode groups TTx1, TTx2, ..., TTx32 in a predetermined order such as in the order from the second electrode group TTx1 to the second electrode group TTx32.

When the first touch detection is performed, the first electrode selection circuit 16 selects a plurality of first electrodes Rx within the first detection area (the first area) DR1 based on the first electrode selection signal SEL1 supplied from the detection controller 11 and simultaneously outputs the first detection signal Vdet1 output from the selected first electrodes Rx. In the example illustrated in FIG. 5, 64 first electrodes Rx obtained by 16-way division of the first detection area DR1 in the first direction Dx are bundled as one first electrode group RRx, and the first detection signal Vdet1 output from a plurality of first electrode groups RRx1, RRx2, . . . , RRx16 is sequentially output in a predetermined order such as in the order from the first electrode group RRx1 to the first electrode group RRx16.

While FIG. 5 illustrates an example in which a plurality of adjacent second electrodes Tx are bundled as one second electrode group TTx, the present disclosure is not limited thereto. A plurality of second electrodes Tx arranged with a plurality of other second electrodes Tx interposed therebetween may be bundled as one second electrode group TTx, for example. While FIG. 5 illustrates an example in which a plurality of adjacent first electrodes Rx are bundled as one first electrode group RRx, the present disclosure is not limited thereto. A plurality of first electrodes Rx arranged with a plurality of other first electrodes Rx interposed therebetween may be bundled as one first electrode group RRx, for example.

Specifically, when the mutual capacitance system-based fingerprint detection is performed, the second electrode selection circuit 15 selects one second electrode Tx within the second detection area (the second area) DR2 based on the second electrode selection signal SEL2 supplied from the detection controller 11 and supplies the second drive signal Vtx2 to the selected second electrode Tx. In the examples illustrated in FIG. 5, the second drive signal Vtx2 is sequentially supplied to second electrodes Tx_1, Tx_2, . . . , Tx_2,048 in a predetermined order such as in the order from the second electrode Tx_1 to the second electrode Tx_2,048.

When the mutual capacitance system-based fingerprint detection is performed, the first electrode selection circuit 16 selects one first electrode Rx within the second detection area (the second area) DR2 based on the first electrode selection signal SEL1 supplied from the detection controller 11 and outputs the second detection signal Vdet2 output from the selected first electrode Rx. In the example illustrated in FIG. 5, the second detection signal Vdet2 output from first electrodes Rx_1, Rx_2, . . . , Rx_1,024 is sequentially output in a predetermined order such as in the order from the first electrode Rx_1 to the first electrode Rx_1,024.

The following describes the detection modes of the detection device 1 according to the present embodiment.

In the detection device 1 according to the present embodiment, the detection controller 11 has a touch detection mode performing only the first touch detection and a touch/fingerprint detection mode (a first mode) performing the first touch detection and the fingerprint detection based on a fingerprint detection instruction from a host system (not illustrated) or the detection controller 11.

Figure 6:
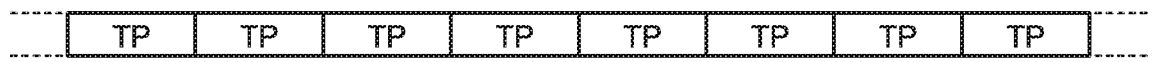
FIG. 6 is an exemplary detection timing chart in a touch detection mode.

FIG. 6 is an exemplary detection timing chart in the touch detection mode. As illustrated in FIG. 6, during the touch detection mode, a first touch detection period (a first period) TP, in which the first touch detection is performed, is consecutively provided.

Figure 7:
FIG. 7 is an exemplary detection timing chart in a touch/fingerprint detection mode.

FIG. 7 is an exemplary detection timing chart in the touch/fingerprint detection mode. As illustrated in FIG. 7, during the touch/fingerprint detection mode, the first touch detection period (the first period) TP, in which the first touch detection is performed, and a fingerprint detection period (a second period) FP, in which the fingerprint detection is performed, are alternately provided.

Thus, in the present embodiment, the first touch detection period (the first period) TP, in which the first touch detection is performed, and the fingerprint detection period (the second period) FP, in which the fingerprint detection is performed, are alternately provided; in the first touch detection period (the first period) TP, the second electrode selection circuit 15 simultaneously selects a plurality of second electrodes Tx within the first detection area (the first area) DR1, whereas the first electrode selection circuit 16 simultaneously selects a plurality of first electrodes Rx within the first detection area (the first area) DR1 and sequentially outputs the first detection signal Vdet1 corresponding to a capacitance change between the first electrodes Rx and the second electrodes Tx. In the fingerprint detection period (the second period) FP, the second electrode selection circuit 15 sequentially selects the second electrodes Tx within the second detection area (the second area) DR2, whereas the first electrode selection circuit 16 sequentially selects the first electrodes Rx within the second detection area (the second area) DR2 and outputs the second detection signal Vdet2 corresponding to a capacitance change between the first electrodes Rx and the second electrodes Tx. With this operation, the fingerprint detection can be performed in the second detection area (the second area) DR2 at a freely-selected position within the first detection area (the first area) DR1, in which the touch detection is performed.

The following describes a configuration in which the second detection area (the second area) DR2 is divided into a plurality of divided areas (third areas) DR3, and the fingerprint detection is performed by detecting a capacitance generated in the first electrodes Rx for each of the divided areas (the third areas) DR3.

First Division Example

Figure 8:
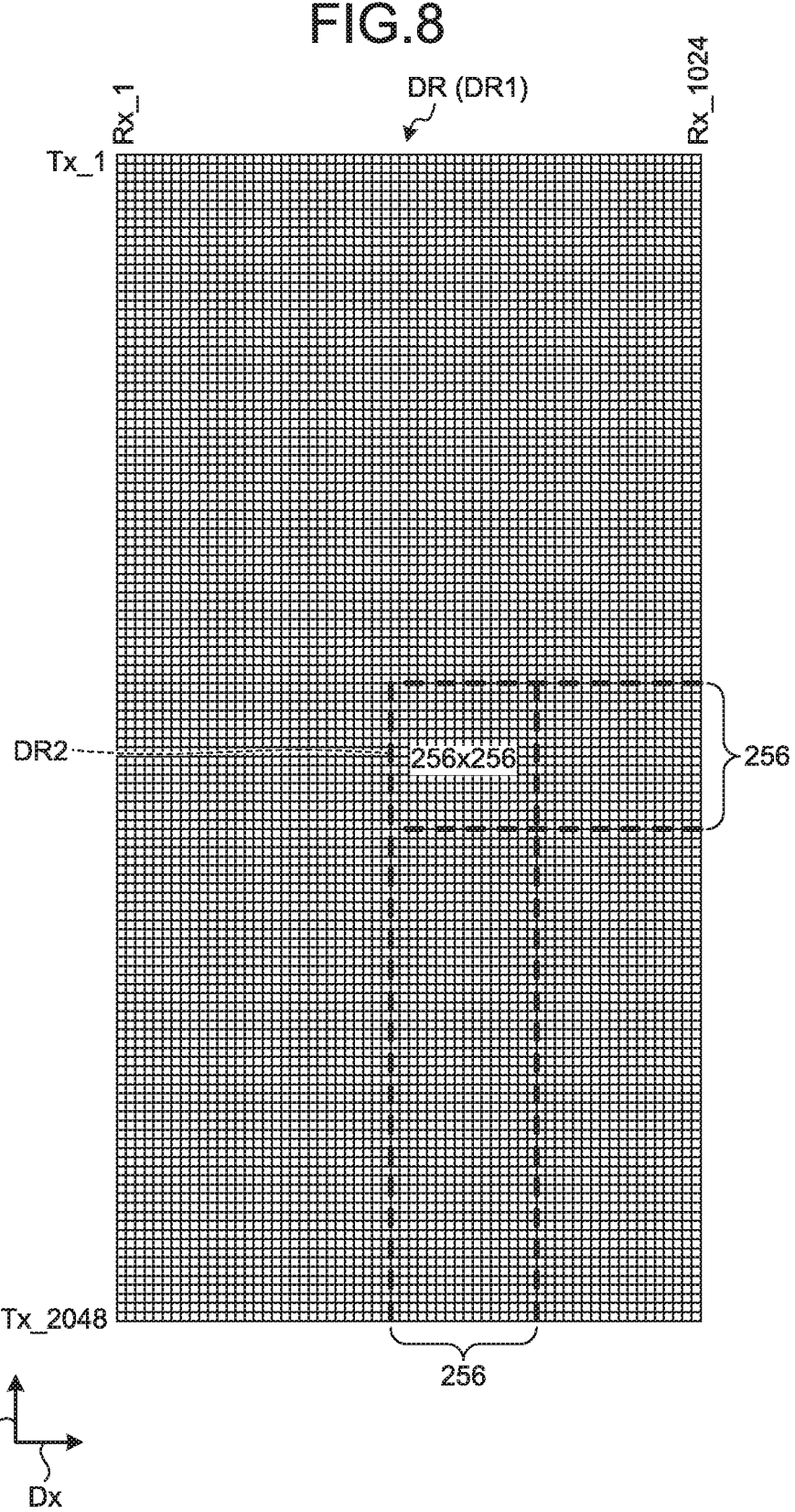
FIG. 8 is a schematic diagram of a second detection area in the touch/fingerprint detection mode of the detection device according to the first embodiment.
Figure 9:
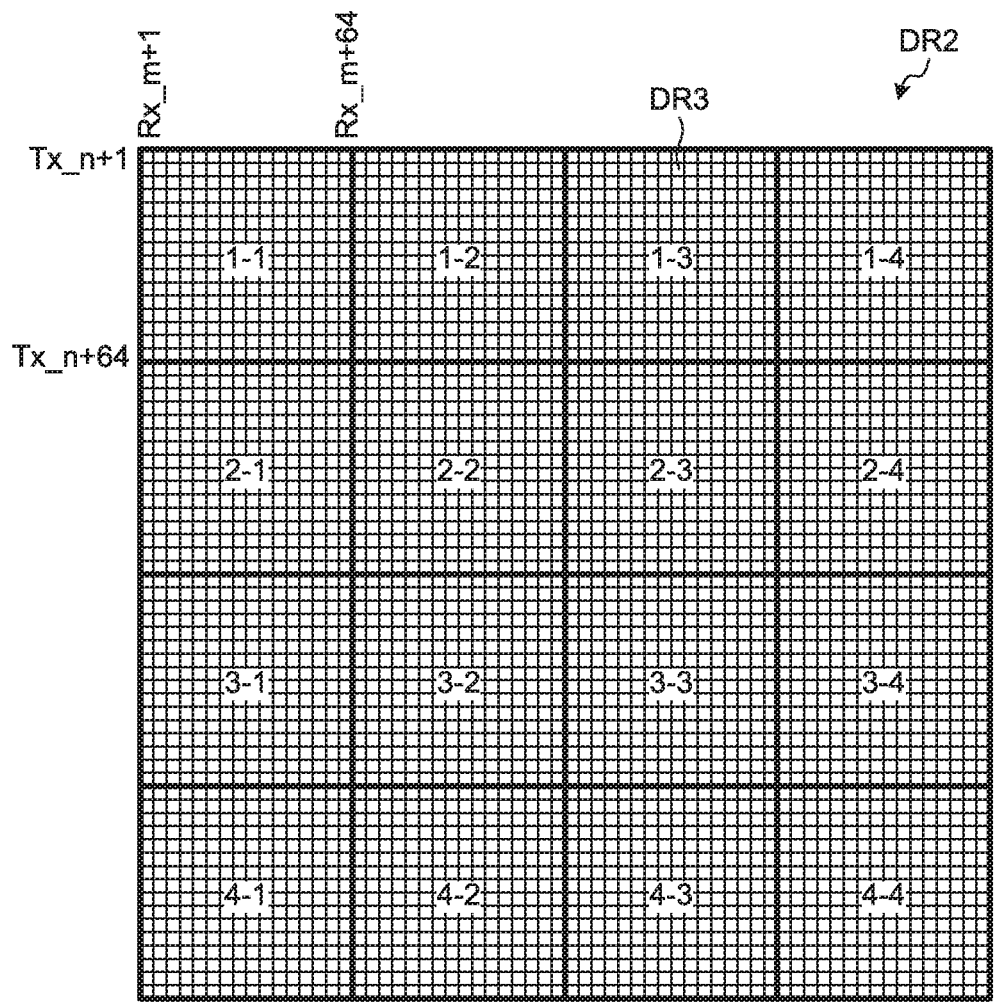
FIG. 9 is a schematic diagram of a first division example enlarging the second detection area illustrated in FIG. 8.

FIG. 8 is a schematic diagram of the second detection area in the touch/fingerprint detection mode of the detection device according to the first embodiment. FIG. 9 is a schematic diagram of a first division example enlarging the second detection area illustrated in FIG. 8. In the first division example, the second detection area DR2 is divided in both the first direction Dx and the second direction Dy.

In the present embodiment, as illustrated in FIG. 8, the second detection area (the second area) DR2, in which the fingerprint detection is performed, is provided in a certain area within the first detection area (the first area) DR1 (the detection area DR in this example), in which the first touch detection is performed. Information on the second detection area (the second area) DR2 is included in the fingerprint detection instruction from the host system (not illustrated).

The detection controller 11 sets the second detection area (the second area) DR2 based on the fingerprint detection instruction. In the example illustrated in FIG. 8, an area in which 256 first electrodes Rx arranged in the first direction Dx and 256 second electrodes Tx arranged in the second direction Dy overlap with each other is set as the second detection area (the second area) DR2. The size and shape of the second detection area DR2 and the size and shape of the divided areas of the second detection area (the second area) DR2 are not limited to the aspect illustrated in FIG. 8 and FIG. 9. The second detection area (the second area) DR2 and the first detection area (the first area) DR1 may match each other, for example. That is to say, the second detection area (the second area) DR2 may be the entire detection area DR.

In the present embodiment, as illustrated in FIG. 9, the second detection area (the second area) DR2 is divided into a plurality of divided areas (the third areas) DR3. The detection controller 11 divides the second detection area (the second area) DR2 into a plurality of areas to set the divided areas (the third areas) DR3. The detection controller 11, in the touch/fingerprint detection mode (the first mode), outputs the first electrode selection signal SEL1 and the second electrode selection signal SEL2 based on the information on the second detection area (the second area) DR2 and information on the divided areas (the third areas) DR3 included in the fingerprint detection instruction.

The first division example illustrated in FIG. 9 illustrates an example of being divided into 16 divided areas (third areas) 1-1, 1-2, 1-3, 1-4, 2-1, 2-2, 2-3, 2-4, 3-1, 3-2, 3-3, 3-4, 4-1, 4-2, 4-3, and 4-4 with an area in which 64 first electrodes Rx arranged in the first direction Dx and 64 second electrodes Tx arranged in the second direction Dy overlap with each other as one divided area (third area) DR3.

When the fingerprint detection is performed, the second electrode selection circuit 15 selects one second electrode Tx within each of the divided areas (the third areas) DR3 based on the second electrode selection signal SEL2 supplied from the detection controller 11 and supplies the second drive signal Vtx2 to the selected second electrode Tx.

Specifically, in the first division example illustrated in FIG. 9, the second electrode selection circuit 15 sequentially supplies the second drive signal Vtx2 to second electrodes Tx_n+1, . . . , Tx_n+64 of the divided area (the third area) 1-1 in a predetermined order such as in the order from the second electrode Tx_n+1 to the second electrode Tx_n+64, for example.

When the fingerprint detection is being performed, the first electrode selection circuit 16 selects the first electrodes Rx within each of the divided areas (the third areas) DR3 based on the first electrode selection signal SEL1 supplied from the detection controller 11 and outputs the second detection signal Vdet2 output from the selected first electrodes Rx.

Specifically, in the first division example illustrated in FIG. 9, the first electrode selection circuit 16 sequentially outputs the second detection signal Vdet2 output from first electrodes Rx_m+1, . . . , Rx_m+64 of the divided area (the third area) 1-1 in a predetermined order such as in the order from the first electrode Rx_m+1 to the first electrode Rx_m+64, for example. The first electrode selection circuit 16 may individually output the second detection signal Vdet2 output from the first electrodes.

Figure 10:
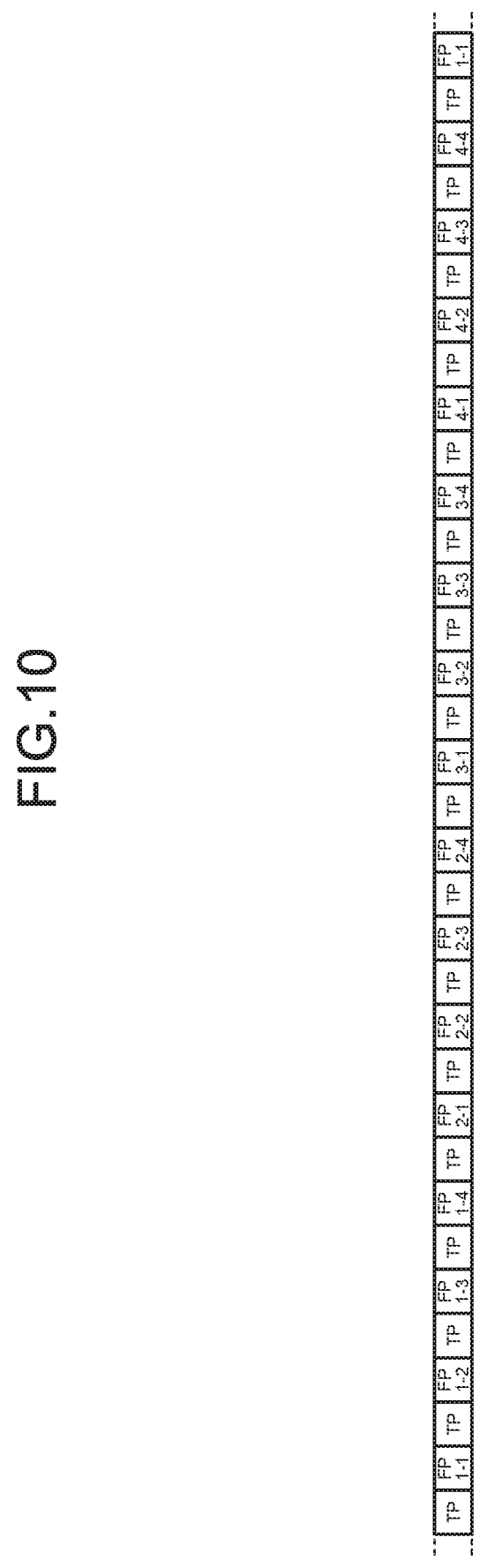

FIG. 10 is an exemplary detection timing chart in the touch/fingerprint detection mode of the first division example of the second detection area illustrated in FIG. 9.

In the present embodiment, in the touch/fingerprint detection mode (the first mode), as illustrated in FIG. 10, the fingerprint detection is performed by detecting the capacitance generated in the first electrodes Rx for each of the divided areas (the third areas) DR3 of the second detection area (the second area) DR2. Specifically, as illustrated in FIG. 10, divided fingerprint detection periods (second periods) FP1-1, FP1-2, FP1-3, FP1-4, FP2-1, FP2-2, FP2-3, FP2-4, FP3-1, FP3-2, FP3-3, FP3-4, FP4-1, FP4-2, FP4-3, and FP4-4, corresponding to the respective divided areas (the third areas) DR3, in each of which the fingerprint detection is performed for the corresponding divided area DR3, are provided. The first touch detection period (the first period) TP, in which the touch detection is performed in the first detection area (the first area) DR1, is provided between adjacent two of the divided fingerprint detection periods (the second periods) FP1-1, FP1-2, FP1-3, FP1-4, FP2-1, FP2-2, FP2-3, FP2-4, FP3-1, FP3-2, FP3-3, FP3-4, FP4-1, FP4-2, FP4-3, and FP4-4. In other words, the touch detection period (the first period) TP, in which the touch detection is performed in the first detection area (the first area) DR1, and each of the divided fingerprint detection periods (the second periods) FP1-1, FP1-2, FP1-3, FP1-4, FP2-1, FP2-2, FP2-3, FP2-4, FP3-1, FP3-2, FP3-3, FP3-4, FP4-1, FP4-2, FP4-3, and FP4-4, in which the fingerprint detection is performed in each of the divided areas (the third areas) DR3, are alternately provided. With this configuration, a report rate of the first touch detection in the first detection area (the first area) DR1 can be made higher than the case (refer to FIG. 7) of alternately providing the first touch detection period (the first period) TP, in which the first touch detection is performed in the first detection area (the first area) DR1, and the fingerprint detection period (the second period) FP, in which the fingerprint detection is performed in the second detection area (the second area) DR2 without dividing the second detection area (the second area) DR2, in which the fingerprint detection is performed, into the divided areas (the third areas) DR3.

Second Division Example

Figure 11:
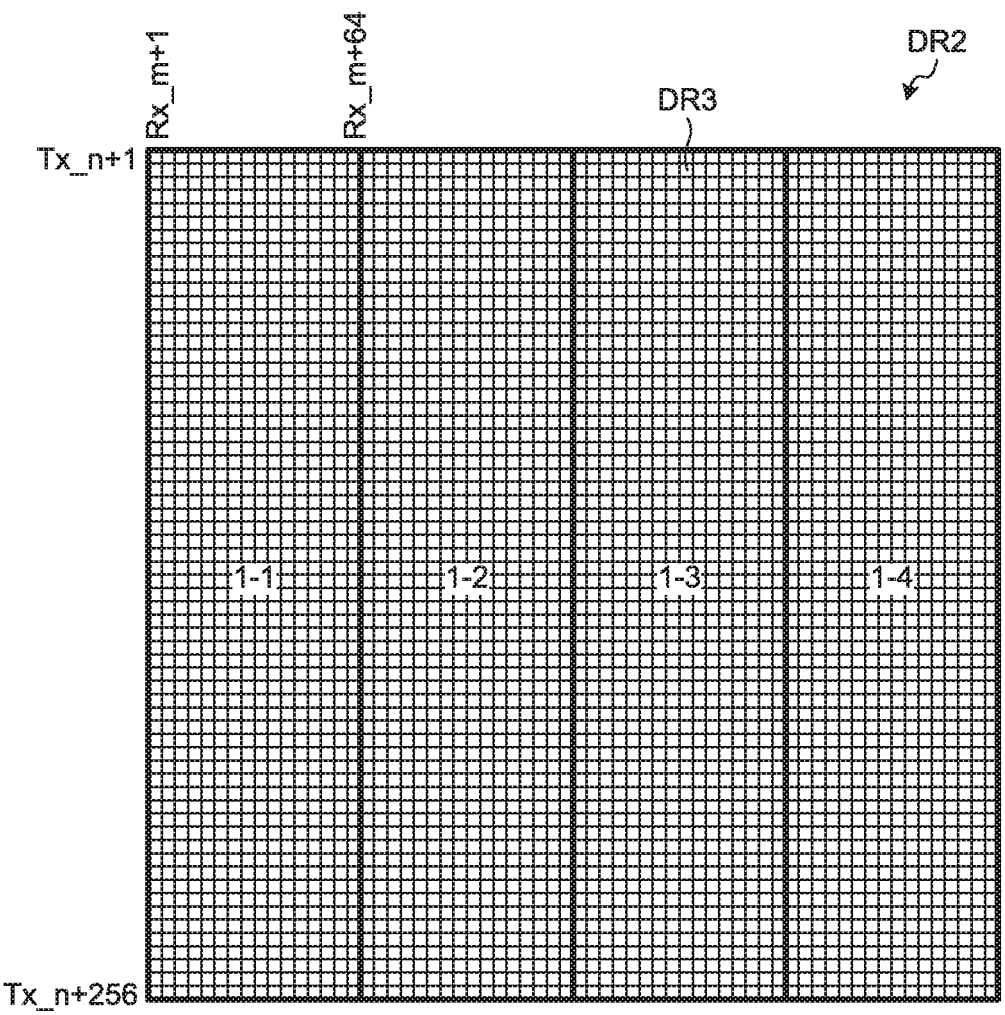
FIG. 11 is a schematic diagram of a second division example enlarging the second detection area illustrated in FIG. 8.

FIG. 11 is a schematic diagram of a second division example enlarging the second detection area illustrated in FIG. 8.

In the second division example illustrated in FIG. 11, the second detection area DR2 is divided in the first direction Dx. Specifically, FIG. 11 illustrates an example of being divided into four divided areas (third areas) 1-1, 1-2, 1-3, and 1-4, with an area in which 64 first electrodes Rx arranged in the first direction Dx and 256 second electrodes Tx arranged in the second direction Dy overlap with each other serving as one divided area (third area) DR3.

In the second division example illustrated in FIG. 11, the second electrode selection circuit 15 sequentially supplies the second drive signal Vtx2 to second electrodes Tx_n+1, . . . , Tx_n+256 of the divided area (the third area) 1-1 in a predetermined order such as in the order from the second electrode Tx_n+1 to the second electrode Tx_n+256, for example.

In the second division example illustrated in FIG. 11, the first electrode selection circuit 16 sequentially outputs the second detection signal Vdet2 output from first electrodes Rx_m+1, . . . , Rx_m+64 of the divided area (the third area) 1-1 in a predetermined order such as in the order from the first electrode Rx_m+1 to the first electrode Rx_m+64, for example. The first electrode selection circuit 16 may individually output the second detection signal Vdet2 output from the first electrodes.

Figure 12:
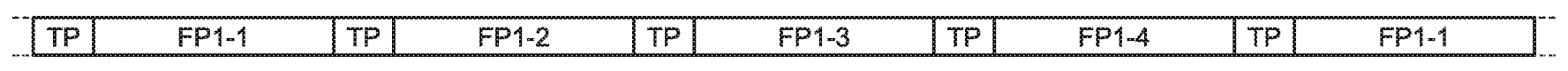

FIG. 12 is an exemplary detection timing chart in the touch/fingerprint detection mode of the second division example of the second detection area illustrated in FIG. 11.

In the second division example illustrated in FIG. 11, as illustrated in FIG. 12, the touch detection period (the first period) TP, in which the first touch detection is performed in the first detection area (the first area) DR1, is provided between adjacent two of divided fingerprint detection periods (the second periods) FP1-1, FP1-2, FP1-3, and FP1-4, in which the fingerprint detection is performed for each of the divided areas (the third areas) DR3. In other words, the touch detection period (the first period) TP, in which the touch detection is performed in the first detection area (the first area) DR1, and each of the divided fingerprint detection periods (the second periods) FP1-1, FP1-2, FP1-3, and FP1-4, in which the fingerprint detection is performed in each of the divided areas (the third areas), are alternately provided. With this configuration, although the report rate of the first touch detection in the first detection area (the first area) DR1 is lower than that of the first division example illustrated in FIG. 10, a report rate of the fingerprint detection in the second detection area (the second area) DR2 can be increased.

Third Division Example

FIG. 13 is a schematic diagram of a third division example enlarging the second detection area illustrated in FIG. 8.

In the third division example illustrated in FIG. 13, the second detection area DR2 is divided in the second direction Dy. Specifically, FIG. 13 illustrates an example of being divided into four divided areas (third areas) 1-1, 2-1, 3-1, and 4-1, with an area in which 256 first electrodes Rx arranged in the first direction Dx and 64 second electrodes Tx arranged in the second direction Dy overlap with each other serving as one divided area (third area) DR3.

In the third division example illustrated in FIG. 13, the second electrode selection circuit 15 sequentially supplies the second drive signal Vtx2 to second electrodes Tx_n+1, . . . , Tx_n+64 of the divided area (the third area) 1-1 in a predetermined order such as in the order from the second electrode Tx_n+1 to the second electrode Tx_n+64, for example.

In the third division example illustrated in FIG. 13, the first electrode selection circuit 16 sequentially outputs the second detection signal Vdet2 output from first electrodes Rx_m+1, . . . , Rx_m+256 of the divided area (the third area) 1-1 in a predetermined order such as in the order from the first electrode Rx_m+1 to the first electrode Rx_m+256, for example. The first electrode selection circuit 16 may individually output the second detection signal Vdet2 output from the first electrodes.

Figure 14:
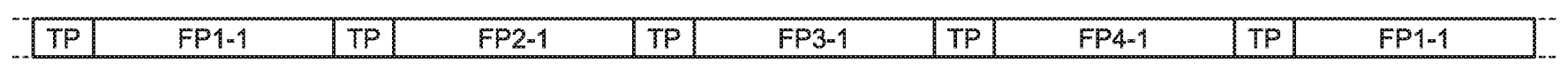

FIG. 14 is an exemplary detection timing chart in the touch/fingerprint detection mode of the third division example of the second detection area illustrated in FIG. 13.

In the third division example illustrated in FIG. 13, as illustrated in FIG. 14, the touch detection period (the first period) TP, in which the touch detection is performed in the first detection area (the first area) DR1, is provided between adjacent two of divided fingerprint detection periods (the second periods) FP1-1, FP2-1, FP3-1, and FP4-1, in which the fingerprint detection is performed for each of the divided areas (the third areas) DR3. In other words, the touch detection period (the first period) TP, in which the touch detection is performed in the first detection area (the first area) DR1, and each of the divided fingerprint detection periods (the second periods) FP1-1, FP2-1, FP3-1, and FP4-1, in which the fingerprint detection is performed in each of the divided areas (the third areas) DR3, are alternately provided. With this configuration, like the second division example illustrated in FIG. 12, although the report rate of the first touch detection in the first detection area (the first area) DR1 is lower than that of the first division example illustrated in FIG. 10, the report rate of the fingerprint detection in the second detection area (the second area) DR2 can be increased.

The detection device 1 according to the first embodiment shifts to the touch detection mode based on a fingerprint detection termination instruction from the host system (not illustrated).

As described above, the detection device 1 according to the first embodiment has the first detection area (the first area) DR1 provided within the detection area DR, the second detection area (the second area) DR2 provided within the first detection area (the first area) DR1, and the divided areas (the third areas) DR3 obtained by dividing the second detection area (the second area) DR2. In the detection device 1, the first electrodes Rx are arranged in the first direction Dx in the first detection area (the first area) DR1 within the detection area DR. In the detection device 1, the second electrodes Tx are arranged in the second direction Dy, which intersects the first direction Dx, in the first detection area (the first area) DR1.

The detection device 1 has the first electrode selection circuit 16 selecting the first electrodes Rx and the second electrode selection circuit 15 selecting the second electrodes Tx. The detection device 1 includes the detector 40 detecting a capacitance generated in the first electrodes Rx or the second electrodes Tx and the detection controller (controller) 11 controlling the first electrode selection circuit 16, the second electrode selection circuit 15, and the detector 40.

The detection controller (controller) 11 at least has the first touch detection period (the first period) TP, in which the first touch detection is performed, and the fingerprint detection period (the second period) FP, in which the fingerprint detection is performed.

The second electrode selection circuit 15 simultaneously selects the second electrodes Tx provided in the second detection area (the second area) DR2 within the first detection area (the first area) DR1 in the touch detection period (the first period) TP. The second electrode selection circuit 15 sequentially selects the second electrodes Tx within the divided areas (the third areas) DR3 obtained by dividing the second detection area (the second area) DR2 in the fingerprint detection period (the second period) FP.

The first electrode selection circuit 16, in the touch detection period (the first period) TP, simultaneously selects the first electrodes Rx within the first detection area (the first area) DR1 and sequentially outputs the first detection signal Vdet1 corresponding to the capacitance change between the first electrodes Rx and the second electrodes Tx. The first electrode selection circuit 16, in the fingerprint detection period (the second period) FP, sequentially selects the first electrodes Rx within the divided areas (the third areas) DR3 and outputs the second detection signal Vdet2 corresponding to the capacitance change between the first electrodes Rx and the second electrodes Tx.

In the above configuration, the detection device 1 at least alternately provides the first touch detection period (the first period) TP, in which the first touch detection is performed, and the fingerprint detection period (the second period) FP, in which the fingerprint detection is performed. With this configuration, the fingerprint detection can be performed in the second detection area (the second area) DR2 at a freely-selected position within the first detection area (the first area) DR1, in which the touch detection is performed.

The second detection area (the second area) DR2 is divided into the divided areas (the third areas) DR3, and the fingerprint detection is performed by detecting the capacitance generated in the first electrodes Rx for each of the divided areas (the third areas) DR3, whereby the report rate of the first touch detection in the first detection area (the first area) DR1 can be increased, and a reduction in touch detection accuracy can be prevented.

Fourth Division Example

In the first division example to the third division example described above, the second detection area (the second area) DR2 provided in a certain area within the first detection area (the first area) DR1, in which the first touch detection is performed, is divided into a plurality of areas to set the divided areas (the third areas) DR3. The divided fingerprint detection periods (the second periods) FP corresponding to the respective divided areas (the third areas) DR3, in each of which the fingerprint detection is performed for the corresponding divided area DR3, are provided. The first touch detection period (the first period) TP, in which the touch detection is performed, is provided between adjacent two of the divided fingerprint detection periods (the second periods) FP. By contrast, in a fourth division example described below, the first detection area (the first area) DR1, in which the first touch detection is performed, is divided into a plurality of areas to set divided areas (fourth areas) DR4. Divided touch detection periods TP corresponding to the respective divided areas (the fourth areas) DR4, in each of which the first touch detection is performed for the corresponding divided area DR4, are provided.

Figure 15:
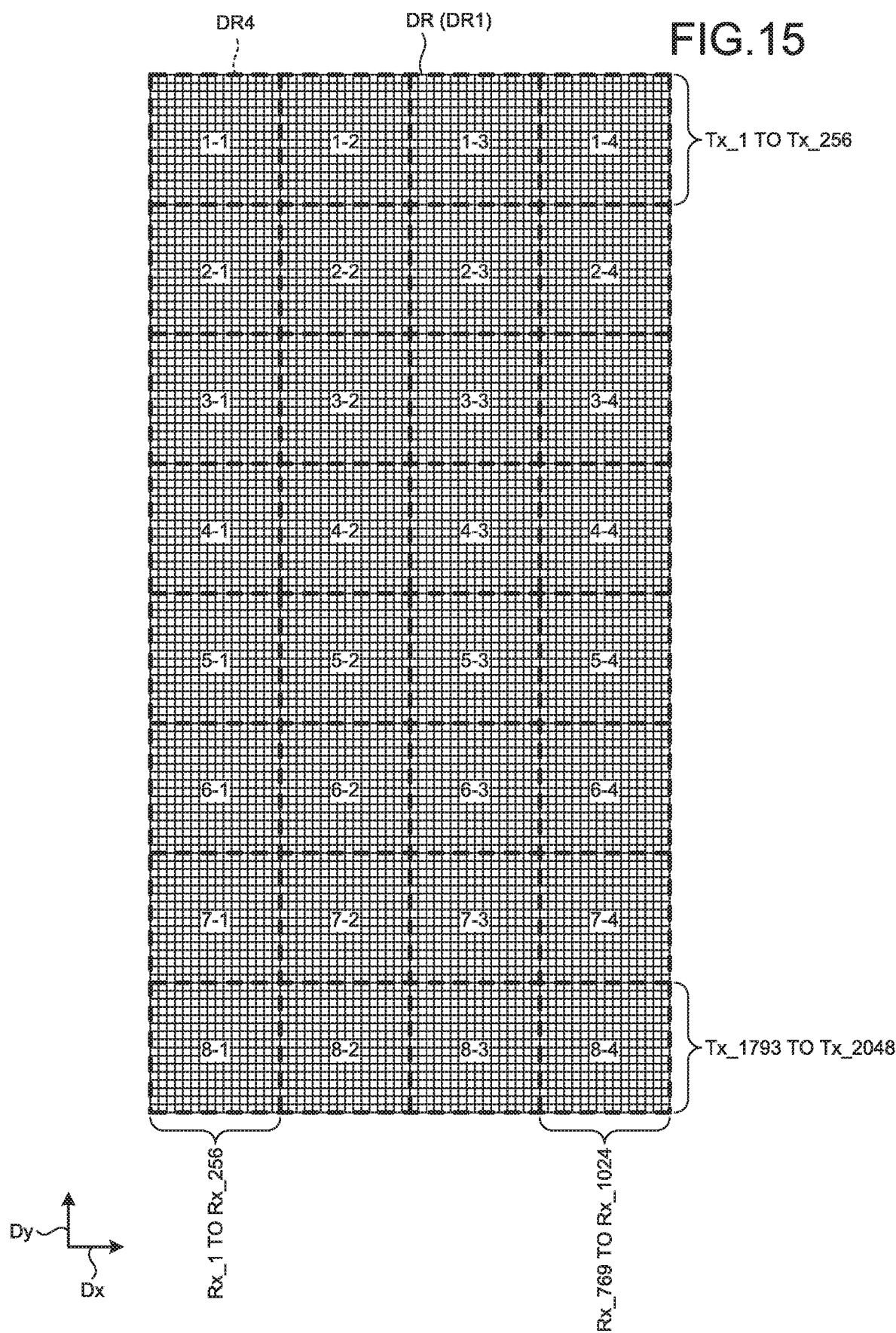
FIG. 15 is a schematic diagram of a fourth division example of the first detection area, in which first touch detection is performed.

FIG. 15 is a schematic diagram of the fourth division example of the first detection area, in which first touch detection is performed. In the fourth division example, the first detection area DR1, in which the first touch detection is performed, is divided in both the first direction Dx and the second direction Dy. In the fourth division example, the second detection area (the second area) DR2, in which the fingerprint detection is performed, will be described with the example illustrated in FIG. 8 used as the second detection area (DR2) and with the first division example illustrated in FIG. 9 used as the division example of the second detection area (DR2).

In the fourth division example, as illustrated in FIG. 15, the first detection area (the first area) DR1, in which the first touch detection is performed, is divided into a plurality of divided areas (fourth areas) DR4.

The fourth division example illustrated in FIG. 15 illustrates an example of being divided into 32 divided areas (fourth areas) 1-1, 1-2, 1-3, 1-4, 2-1, 2-2, 2-3, 2-4, 3-1, 3-2, 3-3, 3-4, 4-1, 4-2, 4-3, 4-4, 5-1, 5-2, 5-3, 5-4, 6-1, 6-2, 6-3, 6-4, 7-1, 7-2, 7-3, 7-4, 8-1, 8-2, 8-3, and 8-4, with an area in which 256 first electrodes Rx arranged in the first direction Dx and 256 second electrodes Tx arranged in the second direction Dy overlap with each other serving as one divided area (fourth area) DR4.

FIG. 16 is an exemplary detection timing chart in the touch/fingerprint detection mode of the fourth division example of the first detection area illustrated in FIG. 15.

In the present embodiment, in the touch/fingerprint detection mode (the first mode), as illustrated in FIG. 16, the first touch detection is performed for each of the divided areas (the fourth areas) DR4 of the first detection area (the first area) DR1. Specifically, as illustrated in FIG. 16, divided touch detection periods TP1-1, TP1-2, TP1-3, TP1-4, TP2-1, TP2-2, . . . , corresponding to the respective divided areas (the fourth areas) DR4, in each of which the first touch detection is performed for the corresponding divided area DR4, are provided. Divided fingerprint detection periods (the second periods) FP1-1, FP1-2, FP1-3, FP1-4, FP2-1, FP2-2, . . . , corresponding to the respective divided areas (the third areas) DR3 in the second detection area (the second area) DR2, in each of which the fingerprint detection is performed for the corresponding divided area DR3, are provided between adjacent two of the divided touch detection periods TP1-1, TP1-2, TP1-3, TP1-4, TP2-1, TP2-2, . . . . In other words, each of the divided touch detection periods TP1-1, TP1-2, TP1-3, TP1-4, TP2-1, TP2-2, . . . , in which the first touch detection is performed for each of divided areas (the fourth areas) DR4 in the first detection area (the first area) DR1, and each of the divided fingerprint detection periods (the second periods) FP1-1, FP1-2, FP1-3, FP1-4, FP2-1, FP2-2, . . . , in which the fingerprint detection is performed for each of the divided areas (the third areas) DR3 in the second detection area (the second area) DR2, are alternately provided.

More specifically, first, in the divided touch detection period (the first period) TP1-1, the first touch detection of the divided area (the fourth area) 1-1 (refer to FIG. 15) is performed. In the next divided fingerprint detection period (the second period) FP1-1, the fingerprint detection of the divided area (the third area) 1-1 (refer to FIG. 9) is performed.

Subsequently, in the divided touch detection period (the first period) TP1-2, the first touch detection of the divided area (the fourth area) 1-2 (refer to FIG. 15) is performed. In the next divided fingerprint detection period (the second period) FP1-2, the fingerprint detection of the divided area (the third area) 1-2 (refer to FIG. 9) is performed.

Subsequently, in the divided touch detection period (the first period) TP1-3, the first touch detection of the divided area (the fourth area) 1-3 (refer to FIG. 15) is performed. In the next divided fingerprint detection period (the second period) FP1-3, the fingerprint detection of the divided area (the third area) 1-3 (refer to FIG. 9) is performed.

Subsequently, in the order of the divided touch detection period (the first period) TP1-3, the divided fingerprint detection period (the second period) FP1-3, the divided touch detection period (the first period) TP1-4, the divided fingerprint detection period (the second period) FP1-4, the divided touch detection period (the first period) TP2-1, the divided fingerprint detection period (the second period) FP2-1, the divided touch detection period (the first period) TP2-2, the divided fingerprint detection period (the second period) FP2-2, . . . , the first touch detection of each corresponding divided area (fourth area) DR4 is performed, and the fingerprint detection of each corresponding divided area (third area) DR3 is performed.

When the fingerprint detection of the divided area (the third area) 4-4 is performed in the divided fingerprint detection period (the second period) FP4-4, the fingerprint detection of the divided area (the third area) 1-1 is performed in the next divided fingerprint detection period (the second period) FP1-1. Subsequently, in the respective divided fingerprint detection periods (the respective second periods), the fingerprint detection of the divided area (the third area) 1-1 to the divided area (the third area) 4-4 is repeatedly performed.

When the first touch detection of the divided area (the fourth area) 8-4 is performed in the divided touch detection period (the first period) TP8-4, the first touch detection of the divided area (the fourth area) 1-1 is performed in the next divided touch detection period (the first period) TP1-1. Subsequently, in the respective divided touch detection periods (the respective first periods), the first touch detection of the divided area (the fourth area) 1-1 to the divided area (the fourth area) 8-4 is repeatedly performed.

As described above, the divided touch detection periods (the first periods) TP1-1 to TP8-4 in the divided areas (the fourth areas) 1-1 to 8-4 (refer to FIG. 16) and the divided fingerprint detection periods (the second periods) FP1-1 to FP4-4 in the divided areas (the third areas) 1-1 to 4-4 (refer to FIG. 9) are alternately provided, whereby the report rate of the fingerprint detection in the second detection area (the second area) DR2 can be increased.

One of the divided areas (the fourth areas) DR4, in which the first touch detection is performed, and the second detection area (the second area) DR2, in which the fingerprint detection is performed, may overlap with each other, or the divided areas (the fourth areas) DR4 and one second detection area (the second area) DR2 may overlap with each other. The divided areas (the fourth areas) DR4, in which the first touch detection is performed, may be provided regardless of the second detection area (the second area) DR2, in which the fingerprint detection is performed.

While the above describes the example in which the first division example illustrated in FIG. 9 is used as the division example of the second detection area (the second area) DR2, in which the fingerprint detection is performed, the present disclosure may employ the second division example illustrated in FIG. 11 or the third division example illustrated in FIG. 13 as a division example of the second detection area (the second area) DR2. Further, while the above describes the example in which the first detection area (the first area) DR1, in which the first touch detection is performed, is divided in both the first direction Dx and the second direction Dy, the first detection area (the first area) DR1 may be divided in the first direction Dx or be divided in the second direction Dy, for example. Such division manners of the first detection area (the first area) DR1 and the second detection area (the second area) DR2 do not limit the present disclosure.

While the above describes the present division example in which the fingerprint detection of the divided area (the third area) 4-4 is performed in the divided fingerprint detection period (the second period) FP4-4, and then the process returns to the fingerprint detection of the divided area (the third area) 1-1 in the next divided fingerprint detection period (the second period) FP1-1, the present disclosure is not limited to this example. Upon termination of the fingerprint detection of the divided area (the third area) 4-4, the mode may shift to the touch detection mode, in which only the first touch detection is performed and the fingerprint detection is not performed, that is, only the touch detection period TP may be provided without providing the divided fingerprint detection period (the second period).

The present embodiment can obtain the detection device 1 that can perform the fingerprint detection at a freely-selected position within a detection area, on which touch detection is performed.

Second Embodiment

While the above describes the first embodiment having a configuration in which the fingerprint detection is performed in one second detection area (second area) DR2 provided within the first detection area (the first area) DR1, the following describes a second embodiment having a configuration in which a plurality of second detection areas (second areas) DR2 are provided within the first detection area (the first area) DR1. FIG. 17 is a schematic diagram of the second detection area in the touch/fingerprint detection mode of the detection device according to the second embodiment. The configuration of the detection device 1 according to the second embodiment is the same as that of the first embodiment, and a detailed description thereof will be omitted. The first detection area (the first area) DR1 of the detection device 1 according to the second embodiment is to the same as that of the first embodiment, and a detailed description thereof will be omitted.

The detection controller 11 sets the second detection areas (the second areas) DR2 based on the fingerprint detection instruction. In the example illustrated in FIG. 17, areas 1-1, 1-2, 1-3, 1-4, 2-1, 2-2, 2-3, 2-4, 3-1, 3-2, 3-3, 3-4, 4-1, 4-2, 4-3, 4-4, 5-1, 5-2, 5-3, 5-4, 6-1, 6-2, 6-3, 6-4, 7-1, 7-2, 7-3, 7-4, 8-1, 8-2, 8-3, and 8-4, in which 256 first electrodes Rx arranged in the first direction Dx and 256 second electrodes Tx arranged in the second direction Dy overlap with each other, are set as the second detection areas (the second areas) DR2. The size and shape of the second detection areas DR2 are not limited to the aspects illustrated in FIG. 17. The aspect of the divided areas (the third areas) DR3 within the second detection areas (the second areas) DR2 can be the aspect of the first division example, the second division example, or the third division example of the first embodiment described above.

The detection controller 11 outputs the second detection signal Vdet2 for each of the divided areas (the third areas) DR3 in one second detection area (second area) DR2 among the second detection areas (the second areas) DR2 and then outputs the second detection signal Vdet2 for each of the divided areas (the third areas) DR3 in another second detection area (second area) DR2.

Specifically, in the example illustrated in FIG. 17, the detection controller 11 outputs the second detection signal Vdet2 for each of the divided areas (the third areas) DR3 in the second detection area (the second area) 1-1. Subsequently, the detection controller 11 outputs the second detection signal Vdet2 for each of the divided areas (the third areas) DR3 in the second detection area (the second area) 1-2. Subsequently, the detection controller 11 outputs the second detection signal Vdet2 for each of the divided areas (the third areas) DR3 in the second detection area (the second area) 1-3. Subsequently, the detection controller 11 outputs the second detection signal Vdet2 for each of the divided areas (the third areas) DR3 in the second detection area (the second area) 1-4. Subsequently, the detection controller 11 outputs the second detection signal Vdet2 for each of the divided areas (the third areas) DR3 in the second detection area (the second area) 5-1. The detection controller 11 outputs the second detection signal Vdet2 for each of the divided areas (the third areas) DR3 throughout the second detection area (the second area) 8-4 and then returns to the second detection area (the second area) 1-1 to output the second detection signal Vdet2 for each of the divided areas (the third areas) DR3. Subsequently, the detection controller 11 outputs the second detection signal Vdet2 for each of the divided areas (the third areas) DR3 in the order of the areas 1-1, 1-2, 1-3, 1-4, 2-1, 2-2, 2-3, 2-4, 3-1, 3-2, 3-3, 3-4, 4-1, 4-2, 4-3, 4-4, 5-1, 5-2, 5-3, 5-4, 6-1, 6-2, 6-3, 6-4, 7-1, 7-2, 7-3, 7-4, 8-1, 8-2, 8-3, and 8-4.

With this operation, the fingerprint detection can be performed in the second detection areas (the second areas) DR2 provided within the first detection area (the first area) DR1.

Third Embodiment

In the first and second embodiments described above, the fingerprint detection is performed by detecting the capacitance generated in the first electrodes Rx for each of the divided areas (the third areas) DR3 of the second detection area (the second area) DR2 in the touch/fingerprint detection mode (the first mode). By contrast, a third embodiment described below has a configuration including a power-saving mode, in which the mutual capacitance system-based first touch detection and fingerprint detection are stopped, apart from the touch/fingerprint detection mode (the first mode) described in the first embodiment. Further, in the example described below, at the time of the non-touch state in the power-saving mode, first baseline data Vb1 used in the first touch detection and second baseline data Vb2 used in the fingerprint detection are updated. The configuration of the detection device 1 according to the third embodiment is the same as those of the first and second embodiments, and a detailed description thereof will be omitted. The first detection area (the first area) DR1 of the detection device 1 according to the third embodiment is the same as those of the first and second embodiments, and a detailed description thereof will be omitted.

In the present embodiment, the detection device 1 has the power-saving mode in addition to the touch detection mode and the touch/fingerprint detection mode (the first mode) described in the first embodiment. Specifically, the detection device 1 shifts to the power-saving mode when it is determined to be the non-touch state consecutively for a certain time, for example, during operation on the touch/fingerprint detection mode (the first mode), for example. When the touch state is detected during operation on the power-saving mode, the detection device 1 shifts to the touch detection mode or the touch/fingerprint detection mode (the first mode). The present embodiment is provided with a second touch detection period (a third period) SELF, in which the self-capacitance system-based touch detection is performed by setting the entire area of the detection area DR as the first detection area (the first area) DR1 and detecting a capacitance generated in the first electrodes Rx in the first detection area (the first area) DR1.

Figure 18:
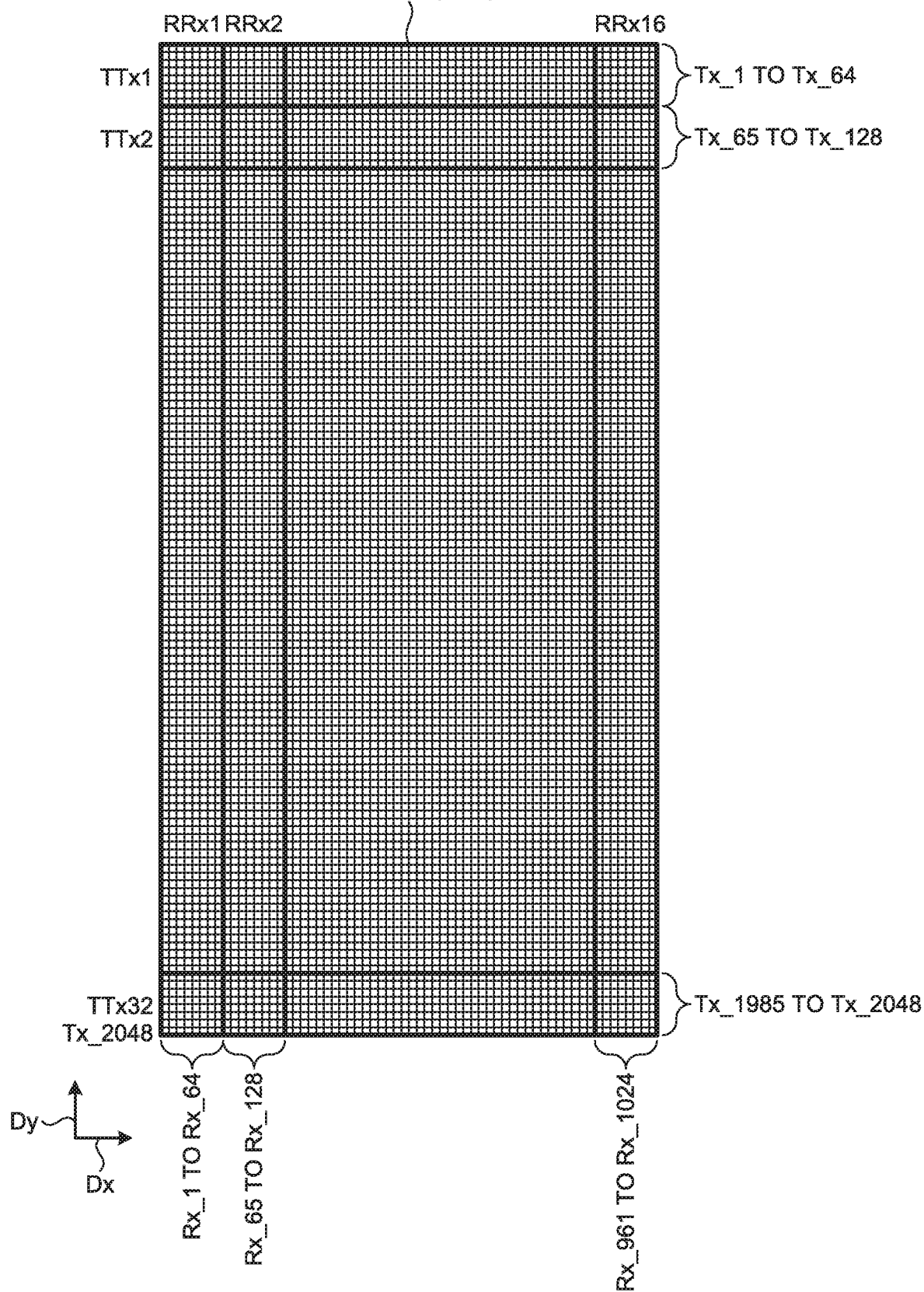
FIG. 18 is a schematic diagram of the first detection area of the detection device according to a third embodiment.

FIG. 18 is a schematic diagram of the first detection area of the detection device according to the third embodiment. FIG. 18 illustrates an example in which in the detection area DR 1,024 first electrodes Rx are arranged in the first direction Dx, whereas 2,048 second electrodes Tx are arranged in the second direction Dy. In FIG. 18, a grid square indicates the intersecting part between the first electrode Rx and the second electrode Tx.

In the present embodiment, the self-capacitance system-based touch detection is performed with the entire area of the detection area DR as the first detection area (the first area) DR1.

Specifically, when the self-capacitance system-based touch detection is performed, the first electrode selection circuit 16 selects a plurality of first electrodes Rx within the first detection area (the first area) DR1 based on the first electrode selection signal SEL1 supplied from the detection controller 11, supplies the third drive signal Vtx3 to the selected first electrodes Rx, and simultaneously outputs the third detection signal Vdet3 output from the selected first electrodes Rx. In the example illustrated in FIG. 18, 64 first electrodes Rx obtained by 16-way division of the first detection area DR1 in the first direction Dx are bundled as one first electrode group RRx, and the first detection signal Vdet1 output from a plurality of first electrode groups RRx1, RRx2, . . . , RRx16 is sequentially output in a predetermined order such as in the order from the first electrode group RRx1 to the first electrode group RRx16. The first detection signal Vdet1 may be individually output from the first electrode groups.

While FIG. 18 illustrates an example in which a plurality of adjacent first electrodes Rx are bundled as one first electrode group RRx, the present disclosure is not limited thereto. A plurality of first electrodes Rx arranged with a plurality of other first electrodes Rx interposed therebetween may be bundled as one first electrode group RRx, or all the first electrodes Rx may be bundled, for example.

Alternatively, when the self-capacitance system-based touch detection is performed, the second electrode selection circuit 15 selects a plurality of second electrodes Tx within the first detection area (the first area) DR1 based on the second electrode selection signal SEL2 supplied from the detection controller 11, supplies the third drive signal Vtx3 to the selected second electrodes Tx, and simultaneously outputs the third detection signal Vdet3 output from the selected second electrodes Tx. In the example illustrated in FIG. 18, 64 second electrodes Tx obtained by 32-way division of the first detection area DR1 in the second direction Dy are bundled as one second electrode group TTx, and the first drive signal Vtx1 is sequentially supplied to a plurality of second electrode groups TTx1, TTx2, . . . , TTx32 in a predetermined order such as in the order from the second electrode group TTx1 to the second electrode group TTx32.

While FIG. 18 illustrates an example in which a plurality of adjacent second electrodes Tx are bundled as one second electrode group TTx, the present disclosure is not limited thereto. A plurality of second electrodes Tx arranged with a plurality of other second electrodes Tx interposed therebetween may be bundled as one second electrode group TTx, or all the second electrodes Tx may be bundled, for example.

First Modification

The following describes the present modification having a configuration in which the power-saving mode has a first power-saving mode (a second mode), in which the first touch detection period (the first period) TP is provided in every predetermined period in which a plurality of second touch detection periods (third periods) SELF are provided. In the first power-saving mode (the second mode), when it is determined to be the non-touch state in the first touch detection period (the first period) TP of the first power-saving mode (the second mode), the first baseline data Vb1 and the second baseline data Vb2 used in the touch detection mode or the touch/fingerprint detection mode (the first mode) are updated. The first baseline data Vb1 is a reference value when the mutual capacitance system-based first touch detection is performed, whereas the second baseline data Vb2 is a reference value when the mutual capacitance system-based fingerprint detection is performed.

Figure 19:
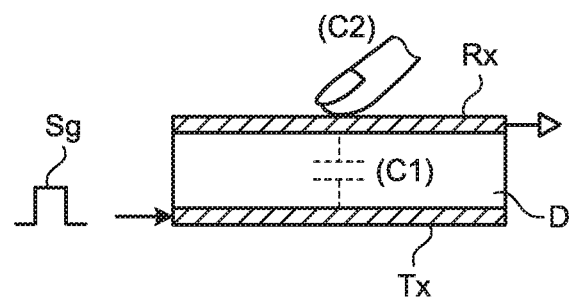
FIG. 19 is an illustrative diagram for illustrating the basic principle of mutual capacitance system-based detection.
Figure 20:
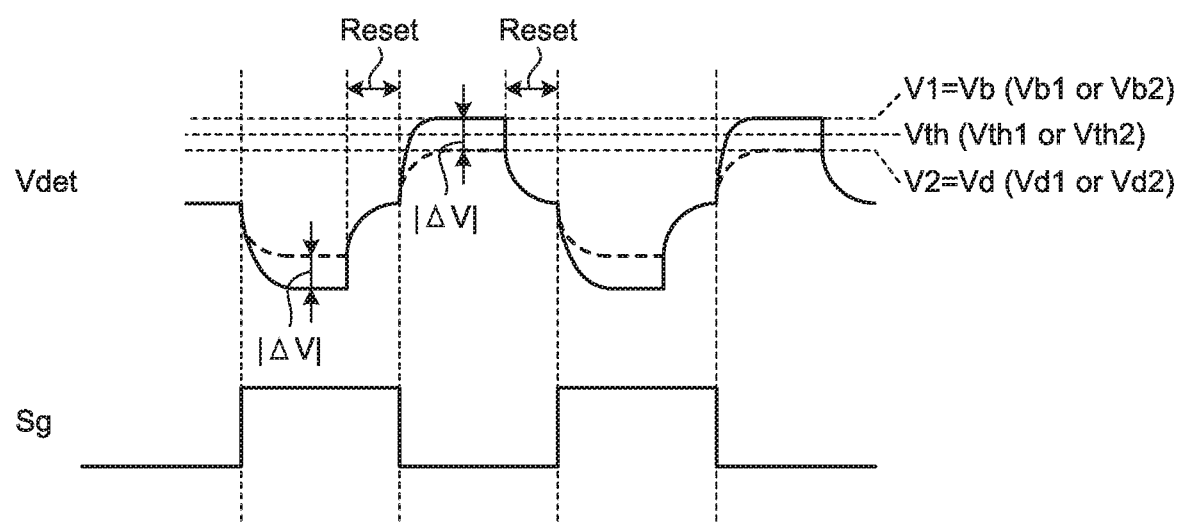
FIG. 20 is a diagram of exemplary waveforms of a drive signal and a detection signal of the mutual capacitance system-based detection.

The following describes a concept of a baseline in the mutual capacitance system with reference to FIG. 19 and FIG. 20.

FIG. 19 is an illustrative diagram for illustrating the basic principle of mutual capacitance system-based detection. FIG. 20 is a diagram of exemplary waveforms of a drive signal and a detection signal of the mutual capacitance system-based detection. While the following describes a case in which a finger is in contact or proximity, the present disclosure is not limited thereto and may be an object including a conductor such as a stylus, for example. In the following, a state in which the finger is not in contact or proximity will be referred to as a "non-contact state", whereas a state in which the finger is in contact or proximity will be referred to as a "contact state".

In the mutual capacitance system, as illustrated in FIG. 19, the second electrode Tx and the first electrode Rx face each other across a dielectric D (the resin layer 27 in FIG. 4) to form a capacitance element C1.

When an AC rectangular wave Sg (the first drive signal Vtx1 or the second drive signal Vtx2) at a predetermined frequency is applied to the second electrode Tx, a current corresponding to the capacitance value of the capacitance element C1 passes therethrough with charge or discharge of the capacitance element C1. A detection signal Vdet (the first detection signal Vdet1 or the second detection signal Vdet2) corresponding to this current is output from the first electrode Rx (refer to FIG. 20).

In FIG. 20, the detection signal Vdet (the first detection signal Vdet1 or the second detection signal Vdet2) in the non-contact state is indicated by a solid line, whereas the detection signal Vdet (the first detection signal Vdet1 or the second detection signal Vdet2) in the contact state is indicated by a broken line.

In the contact state, as illustrated in FIG. 19, a capacitance C2 is generated by the finger, and the capacitance element C1 acts as a capacitance element with a capacitance value smaller than a capacitance value in the non-contact state. Consequently, as illustrated in FIG. 20, a peak value V2 of the detection signal Vdet (the first detection signal Vdet1 or the second detection signal Vdet2) in the contact state is smaller than a peak value V1 of the detection signal Vdet (the first detection signal Vdet1 or the second detection signal Vdet2) in the non-contact state.

With the peak value V1 of the detection signal Vdet (the first detection signal Vdet1 or the second detection signal Vdet2) in the non-contact state serving as a baseline Vb and with the peak value V2 of the detection signal Vdet (the first detection signal Vdet1 or the second detection signal Vdet2) in the contact state serving as the detection value Vd, the mutual capacitance system-based detection is performed based on an absolute value |ΔV| of a difference between the baseline Vb and the detection value Vd.

Specifically, the detector 40 compares the absolute value |ΔV| with a predetermined threshold voltage Vth, and when the absolute value |ΔV| is less than the threshold voltage Vth, determines that the finger is in the non-contact state. In contrast, when the absolute value |ΔV| is the threshold voltage Vth or more, the detector 40 determines that the finger is in a contact-or-proximity state. When it is determined that the finger is in a contact-or-proximity state, the detector 40 detects a capacitance change by a recess or protrusion on the surface of the finger based on the difference in the absolute value |ΔV|.

The peak value of the detection signal Vdet (the first detection signal Vdet1 or the second detection signal Vdet2) fluctuates by the addition of a parasitic capacitance to the capacitance element C1. Specifically, the capacitance value of the capacitance element C1 fluctuates with time by the parasitic capacitance, and accordingly the peak value of the detection signal Vdet (the first detection signal Vdet1 or the second detection signal Vdet2), i.e., the detection value Vd in the mutual capacitance system fluctuates. For this reason, the baseline Vb as a reference value when the mutual capacitance system-based detection is performed has to be updated as needed.

In the present embodiment, the baseline Vb corresponds to the first baseline data Vb1 as the reference value when the mutual capacitance system-based first touch detection is performed and the second baseline data Vb2 as the reference value when the mutual capacitance system-based fingerprint detection is performed. The detection value Vd corresponds to first detection data Vd1 in the mutual capacitance system-based first touch detection and second detection data Vd2 in the mutual capacitance system-based fingerprint detection. The threshold voltage Vth corresponds to a first threshold voltage Vth1 when the mutual capacitance system-based first touch detection is performed and a second threshold voltage Vth2 when the mutual capacitance system-based fingerprint detection is performed.

FIG. 21 is an exemplary detection timing chart in the first power-saving mode of the detection device according to the first modification of the third embodiment. In the first modification illustrated in FIG. 21, in the first power-saving mode (the second mode), the first touch detection period (the first period) TP is provided in every predetermined period in which the second touch detection periods (the third periods) SELF are provided. In the present modification, the first detection data Vd1 detected in the first touch detection period (the first period) TP is updated as the first baseline data Vb1 as the reference value when the mutual capacitance system-based first touch detection is performed.

The detection device 1 shifts to the first power-saving mode (the second mode) when it is determined to be the non-touch state consecutively for a certain time, for example, during operation on the touch/fingerprint detection mode (the first mode). When the touch state is detected during operation on the first power-saving mode (the second mode), the detection device 1 shifts to the touch detection mode or the touch/fingerprint detection mode (the first mode).

In the first power-saving mode (the second mode), when the touch state (the contact state) is not detected in the second touch detection period (the third period) SELF, i.e., in the non-touch state, the signal processor 44 of the detector 40 updates the first detection data (the detection value) Vd1 detected in the first touch detection period (the first period) TP as the first baseline data (the reference value) Vb1 for the first touch detection and stores it in the storage circuit 46.

In the first modification, the signal processor 44 of the detector 40 multiplies the first detection data (the detection value) Vd1 detected in the first touch detection period (the first period) TP by a certain factor, for example, to estimate the second detection data Vd2 in the mutual capacitance system-based fingerprint detection. The signal processor 44 of the detector 40 then updates the estimated second detection data Vd2 as the second baseline data (the reference value) Vb2 for the fingerprint detection and stores it in the storage circuit 46.

With this operation, the first baseline data (the reference value) Vb1 and the second baseline data (the reference value) Vb2 fluctuating with time during operation on the first power-saving mode (the second mode) can be updated.

Second Modification

The above describes the first modification using an example in which the second detection data Vd2 in the mutual capacitance system-based fingerprint detection is estimated, the following describes a second modification using an example in which the second detection data Vd2 in the mutual capacitance system-based fingerprint detection is detected.

Specifically, in the second modification, the power-saving mode has a second power-saving mode (a third mode), in which the first touch detection period (the first period) TP and the fingerprint detection period (the second period) are provided in every predetermined period in which the second touch detection periods (the third periods) SELF are provided, and the second detection data Vd2 in the mutual capacitance system-based fingerprint detection is detected in the divided fingerprint detection period (the second period) of the second power-saving mode (the third mode).

Figure 22:
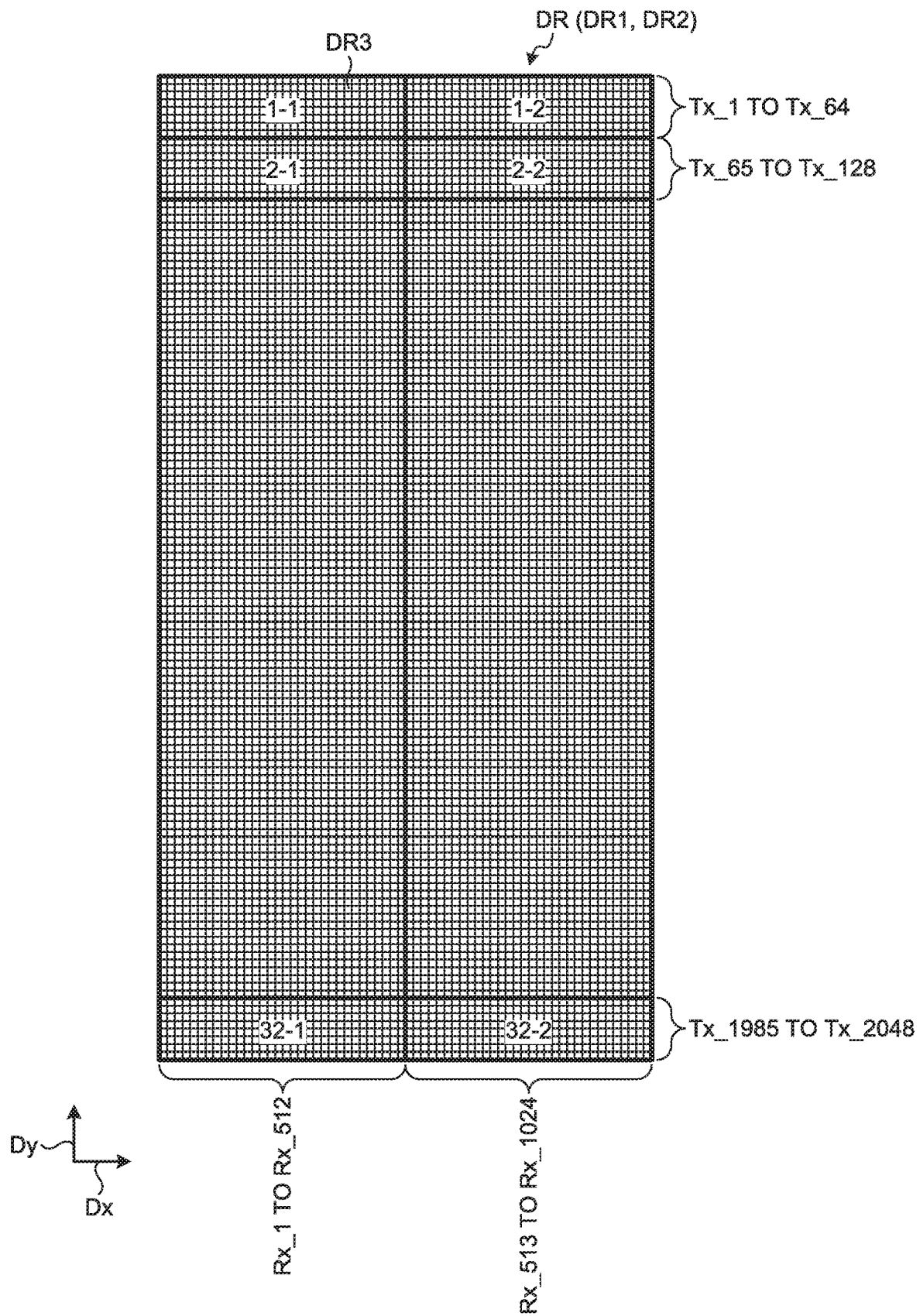
FIG. 22 is a schematic diagram of a division example of the second detection area in a second power-saving mode of the detection device according to a second modification of the third embodiment.
Figure 23:
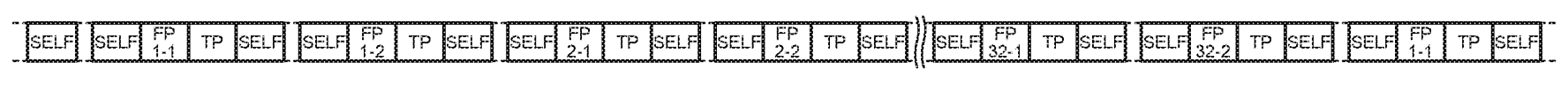

FIG. 22 is a schematic diagram of a division example of the second detection area in the second power-saving mode of the detection device according to the second modification of the third embodiment. FIG. 23 is an exemplary detection timing chart in the second power-saving mode of the detection device according to the second modification of the third embodiment. The following describes an example in which touch detection is performed with all the first electrodes Rx (or the second electrodes Tx) bundled in the second touch detection period (the third period) SELF, in which the self-capacitance system-based touch detection is performed.

In the second modification of the present embodiment, in the second power-saving mode (the third mode), as illustrated in FIG. 22, the fingerprint detection is performed with the entire area of the detection area DR as the second detection area (the second area) DR2. As illustrated in FIG. 23, in the second modification, in the second power-saving mode (the third mode), the first touch detection period (the first period) TP and the fingerprint detection period (the second period) FP are provided in every predetermined period in which the second touch detection periods (the third periods) SELF are provided. In the present modification, the first detection data Vd1 detected in the first touch detection period (the first period) TP is updated as the first baseline data Vb1 as the reference value when the mutual capacitance system-based first touch detection is performed, whereas the second detection data Vd2 detected in the fingerprint detection period (the second period) FP (each of divided fingerprint detection periods FP1-1, FP1-2, FP2-1, FP2-2, . . . , FP32-1, and FP32-2) is updated as the second baseline data Vb2 as the reference value when the mutual capacitance system-based fingerprint detection is performed.

The detection device 1 shifts to the second power-saving mode (the third mode) when it is determined to be the non-touch state consecutively for a certain time, for example, during operation on the touch/fingerprint detection mode (the first mode). When the touch state is detected during operation on the second power-saving mode (the third mode), the detection device 1 shifts to the touch detection mode or the touch/fingerprint detection mode (the first mode).

Specifically, the first electrode selection circuit 16 supplies the third drive signal Vtx3 to the first electrodes Rx within the first detection area (the first area) DR1 in the second touch detection period (the third period) SELF. The first electrode selection circuit 16 outputs the third detection signal Vdet3 output from the first electrodes Rx within the first detection area (the first area) DR1. When the touch state is detected in this second touch detection period (the third period) SELF, the detection device 1 shifts to the touch detection mode or the touch/fingerprint detection mode (the first mode) described in the first embodiment.

Alternatively, the second electrode selection circuit 15 supplies the third drive signal Vtx3 to the second electrodes Tx within the first detection area (the first area) DR1 in the second touch detection period (the third period) SELF. The second electrode selection circuit 15 outputs the third detection signal Vdet3 output from the second electrodes Tx within the first detection area (the first area) DR1. When the touch state is detected in this second touch detection period (the third period) SELF, the detection device 1 shifts to the touch detection mode or the touch/fingerprint detection mode (the first mode) described in the first embodiment.

In the second power-saving mode (the third mode) of the second modification, as illustrated in FIG. 23, the fingerprint detection is performed in a time-division manner for each divided area of the second detection area (the second area) DR2.

Specifically, as illustrated in FIG. 23, the divided fingerprint detection periods (the second periods) FP1-1, FP1-2, FP2-1, FP2-2, . . . , FP32-1, and FP32-2, in which the fingerprint detection is performed in the respective divided areas illustrated in FIG. 22, are provided. In the second power-saving mode (the third mode) of the second modification, each divided fingerprint detection period (second period) is provided in every predetermined period in which the second touch detection periods (the third periods) SELF are provided. In the second modification of the present embodiment, in the second power-saving mode (the third mode), the first touch detection period (the first period) TP is provided in every predetermined period in which the second touch detection periods (the third periods) SELF are provided. FIG. 23 illustrates an example in which, each of the divided fingerprint detection periods (the second periods) FP1-1, FP1-2, FP2-1, FP2-2, . . . , FP32-1, and FP32-2 is provided in every predetermined period in which the second touch detection periods (the third periods) SELF are provided, and the first touch detection period (the first period) TP is provided immediately after each of the divided fingerprint detection periods (the second periods) FP1-1, FP1-2, FP2-1, FP2-2, . . . , FP32-1, and FP32-2. The positions at which the divided fingerprint detection periods (the second periods) FP1-1, FP1-2, FP2-1, FP2-2, . . . , FP32-1, and FP32-2 and the first touch detection period (the first period) TP are provided are not limited to this example. Each of the divided fingerprint detection periods (the second periods) FP1-1, FP1-2, FP2-1, FP2-2, . . . , FP32-1, and FP32-2 may be provided immediately after the first touch detection period (the first period) TP, or one or a plurality of second touch detection periods (the third periods) SELF may be provided between the first touch detection period (the first period) TP and each of the divided fingerprint detection periods (the second periods) FP1-1, FP1-2, FP2-1, FP2-2, . . . , FP32-1, and FP32-2, for example.

In the second power-saving mode (the third mode), when the touch state (the contact state) is not detected in the second touch detection period (the third period) SELF, i.e., in the non-touch state, the signal processor 44 of the detector 40 updates the first detection data (the detection value) Vd1 detected in the first touch detection period (the first period) TP as the first baseline data (the reference value) Vb1 for the first touch detection and stores it in the storage circuit 46.

In the second power-saving mode (the third mode), when the touch state (the contact state) is not detected in the second touch detection period (the third period) SELF, i.e., in the non-touch state, the signal processor 44 of the detector 40 updates the second detection data (the detection value) Vd2 detected in each of the divided fingerprint detection periods (the second periods) FP1-1, FP1-2, FP2-1, FP2-2, . . . , FP32-1, and FP32-2 as the second baseline data (the reference value) Vb2 for the fingerprint detection and stores it in the storage circuit 46.

With this operation, touch detection accuracy and fingerprint detection accuracy in the touch detection mode and the touch/fingerprint detection mode (the first mode) can be maintained at high accuracy.

Third Modification

In the first power-saving mode (the second mode) described in the first modification, even when the touch state is not detected in the second touch detection period (the third period) SELF, the first detection data (the detection value) Vd1 detected in the first touch detection period (the first period) TP may significantly fluctuate. In this case, the accuracy of the second detection data Vd2 estimated from the first detection data (the detection value) Vd1 reduces, and consequently, the accuracy of the second baseline data (the reference value) Vb2 for the fingerprint detection may reduce.

In a third modification, in the first touch detection period (the first period) TP of the first power-saving mode (the second mode) illustrated in FIG. 21 (the first modification), when the first detection data (the detection value) Vd1 fluctuates beyond a certain baseline threshold Vbth, the mode shifts to the second power-saving mode (the third mode) illustrated in FIG. 23 (the second modification), and the second detection data (the detection value) Vd2 detected in the fingerprint detection period (the second period) FP is updated as the second baseline data (the reference value) Vb2 for the fingerprint detection and is stored in the storage circuit 46. With this operation, even when the first detection data (the detection value) Vd1 detected in the first touch detection period (the first period) TP of the first power-saving mode (the second mode) significantly fluctuates, the second detection data (the detection value) Vd2 detected in the fingerprint detection period (the second period) FP of the second power-saving mode (the third mode) can be updated as the second baseline data (the reference value) Vb2 for the fingerprint detection, and the accuracy of the second baseline data (the reference value) Vb2 for the fingerprint detection can be improved.

Specifically, in the third modification, when the first detection data (the detection value) Vd1 detected in the first touch detection period (the first period) TP of the first power-saving mode (the second mode) fluctuates beyond the baseline threshold Vbth, as illustrated in FIG. 22, the mode shifts to the second power-saving mode (the second mode) with the first detection area (the first area) DR1 (the detection area DR in this example) as the second detection area (the second area) DR2 and with the second detection area (the second area) DR2 divided into a plurality of divided areas 1-1, 1-2, 2-1, 2-2, . . . , 32-1, and 32-2. The second detection data (the detection value) Vd2 detected in the divided fingerprint detection periods (the second periods) FP1-1, FP1-2, FP2-1, FP2-2, . . . , FP32-1, and FP32-2 of the second power-saving mode (the third mode) is updated as the second baseline data (the reference value) Vb2 for the fingerprint detection and is stored in the storage circuit 46.

More specifically, when a difference between the first detection data (the detection value) Vd1 detected in the first touch detection period (the first period) TP of the first power-saving mode (the second mode) illustrated in FIG. 21 and the first baseline data (the reference value) Vb1 stored in the storage circuit 46 is the baseline threshold Vbth (|Vd1−Vb1|≤Vbth) or less, the signal processor 44 of the detector 40 estimates the second baseline data (the reference value) Vb2 for the fingerprint detection based on the first detection data (the detection value) Vd1.

In contrast, when the first detection data (the detection value) Vd1 fluctuates beyond the baseline threshold Vbth (|Vd1−Vb1|>Vbth), the signal processor 44 of the detector 40 outputs that information to the detection controller 11. Based on that information, the detection controller 11 shifts the mode to the second power-saving mode (the third mode) illustrated in FIG. 23 and controls the parts of the detection device 1. The signal processor 44 of the detector 40 updates the second detection data (the detection value) Vd2 detected in the divided fingerprint detection periods (the second periods) FP1-1, FP1-2, FP2-1, FP2-2, . . . , FP32-1, and FP32-2 of the second power-saving mode (the third mode) as the second baseline data (the reference value) Vb2 for the fingerprint detection and stores it in the storage circuit 46.

With this operation, even when the first detection data (the detection value) Vd1 detected in the first touch detection period (the first period) TP of the first power-saving mode (the third mode) significantly fluctuates, the second detection data (the detection value) Vd2 detected in the fingerprint detection period (the second period) FP of the second power-saving mode (the third mode) can be updated as the second baseline data (the reference value) Vb2 for the fingerprint detection, and the accuracy of the second baseline data (the reference value) Vb2 for the fingerprint detection can be improved.

Fourth Modification

In the third modification described above, in the first power-saving mode (the second mode), when the difference between the first detection data (the detection value) Vd1 and the first baseline data (the reference value) Vb1 fluctuates beyond the baseline threshold Vbth (|Vd1−Vb1|>Vbth), the mode shifts to the second power-saving mode (the third mode) with the entire area of the first detection area (the first area) DR1 (the detection area DR in this example) as the second detection area (the second area) DR2. By contrast, in a fourth modification described below, in the first power-saving mode (the second mode), the mode shifts to the second power-saving mode (the third mode) with an area in which the difference between the first detection data (the detection value) Vd1 and the first baseline data (the reference value) Vb1 fluctuates beyond the baseline threshold Vbth set as the second detection area (the second area) DR2.

Figure 24:
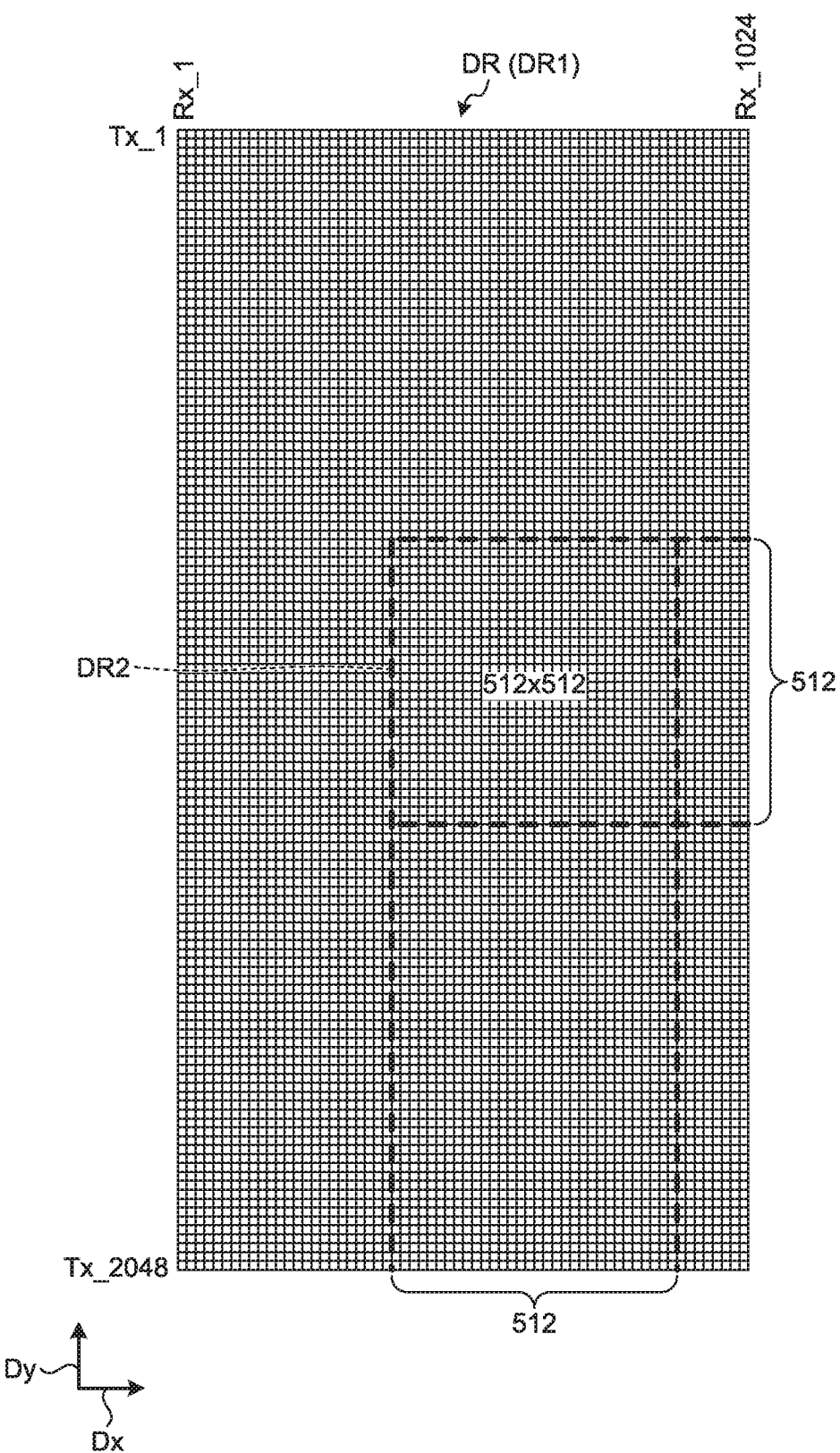
FIG. 24 is a schematic diagram of a division example of the second detection area in the second power-saving mode of the detection device according to a fourth modification of the third embodiment.
Figure 25:
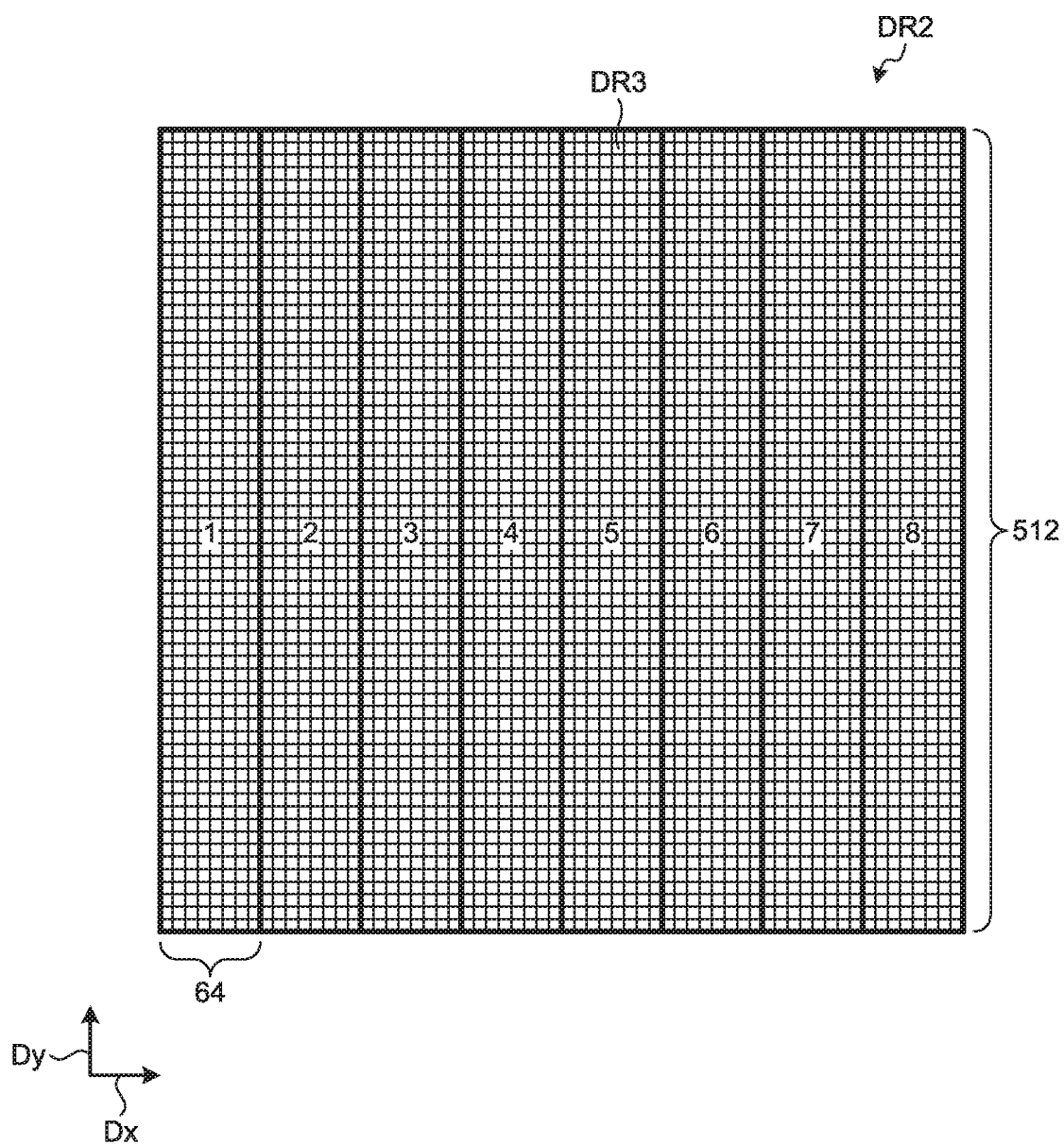
FIG. 25 is a schematic diagram of a division example enlarging the second detection area illustrated in FIG. 24.
Figure 27:
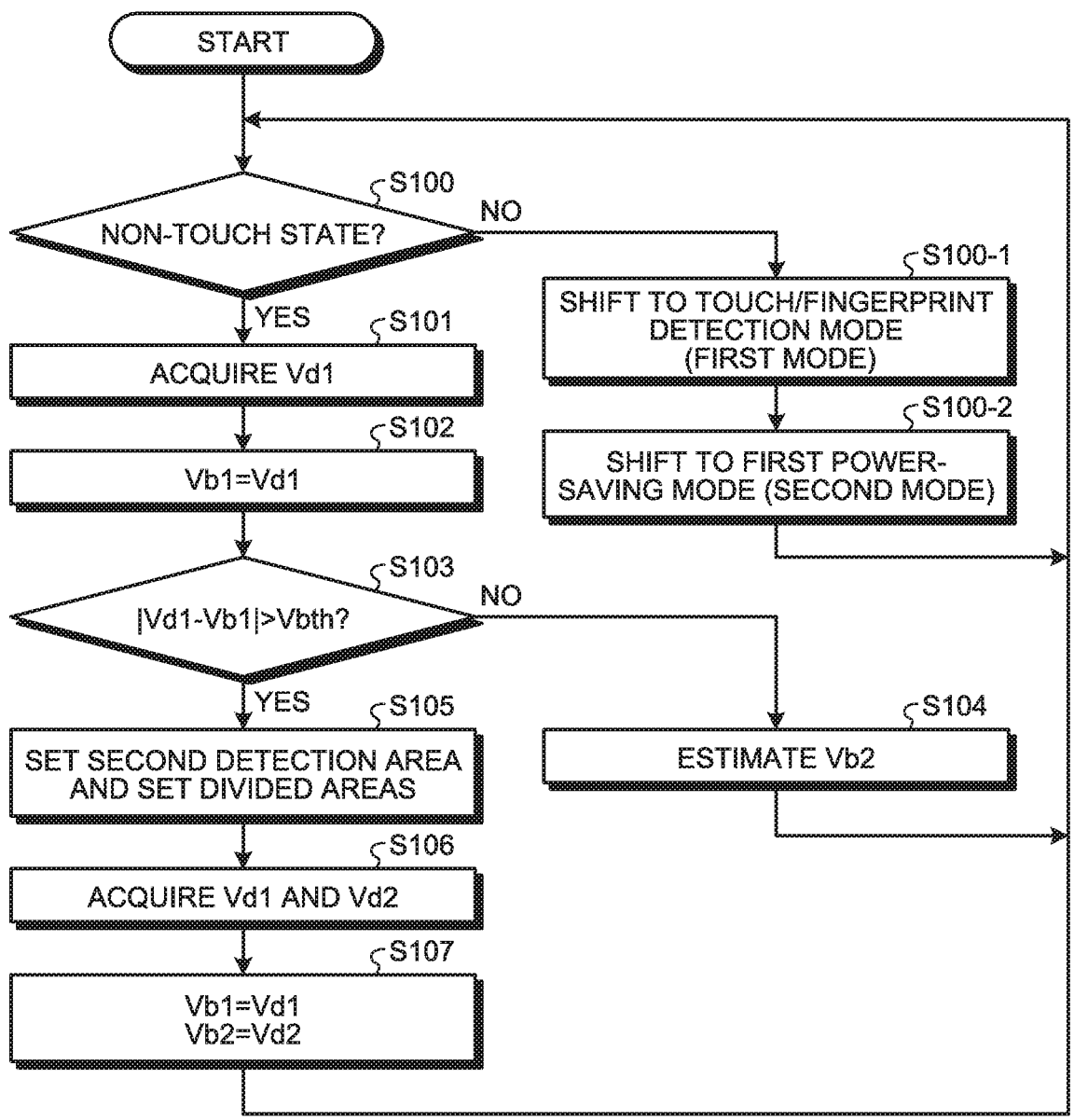
FIG. 27 is a flowchart of exemplary processing in the fourth modification of the third embodiment.

FIG. 24 is a schematic diagram of a division example of the second detection area in the second power-saving mode of the detection device according to the fourth modification of the third embodiment. FIG. 25 is a schematic diagram of a division example enlarging the second detection area illustrated in FIG. 24. FIG. 26 is an exemplary detection timing chart in the second power-saving mode of the detection device according to the fourth modification of the third embodiment. FIG. 27 is a flowchart of exemplary processing in the fourth modification of the third embodiment.

The example illustrated in FIG. 24 and FIG. 25 illustrates an example in which within the first detection area (the first area) DR1 (the detection area DR in this example), an area in which 512 first electrodes Rx arranged in the first direction Dx and 512 second electrodes Tx arranged in the second direction Dy overlap with each other is set as the second detection area (the second area) DR2, which is divided into eight divided areas DR3 (areas 1, 2, 3, . . . , 7, and 8) in which 64 first electrodes Rx arranged in the first direction Dx and 512 second electrodes Tx arranged in the second direction Dy overlap with each other. The size and shape of the second detection area (the second area) DR2 and the size and shape of the divided areas of the second detection area (the second area) DR2 are not limited to the aspects illustrated in FIG. 24 and FIG. 25.

In FIG. 26, the positions at which divided fingerprint detection periods (the second periods) FP1, FP2, FP3, . . . , FP7, and FP8 and the first touch detection period (the first period) TP are provided are not limited to this example. The first touch detection period (the first period) TP may be provided immediately after each of the divided fingerprint detection periods (the second periods) FP1, FP2, FP3, . . . , FP7, and FP8, or one or a plurality of second touch detection periods (the third periods) SELF may be provided between the first touch detection period (the first period) TP and each of the divided fingerprint detection periods (the second periods) FP1, FP2, FP3, . . . , FP7, and FP8, for example.

In the fourth modification, when the difference between the first detection data (the detection value) Vd1 detected in the first touch detection period (the first period) TP of the first power-saving mode (the second mode) illustrated in FIG. 21 (the first modification) and the first baseline data (the reference value) Vb1 stored in the storage circuit 46 fluctuates beyond the baseline threshold Vbth (|Vd1−Vb1|>Vbth), the mode shifts to the second power-saving mode (the third mode) illustrated in FIG. 26. In the present modification, as described above, the area in which the difference between the first detection data (the detection value) Vd1 detected in the first touch detection period (the first period) TP of the first power-saving mode (the second mode) and the first baseline data (the reference value) Vb1 stored in the storage circuit 46 fluctuates beyond the baseline threshold Vbth is set as the second detection area (the second area) DR2 when the second detection data Vd2 in the mutual capacitance system-based fingerprint detection is detected in the second power-saving mode (the third mode). The following describes specific processing in the fourth modification.

As a premise of the processing illustrated in FIG. 27, assume that the first baseline data (the reference value) Vb1 for the first touch detection and the second baseline data (the reference value) Vb2 for the fingerprint detection are stored in the storage circuit 46 in advance and the detection device 1 is operating on the first power-saving mode (the second mode) illustrated in FIG. 21 in the non-touch state.

The signal processor 44 of the detection device 1 determines whether the non-touch state is present in the second touch detection periods (the third periods) SELF of the first power-saving mode (the second mode) illustrated in FIG. 21 (Step S100). If the non-touch state is not present (No at Step S100), the process shifts to the touch/fingerprint detection mode (the first mode) (Step S100-1). After shifting to the touch/fingerprint detection mode (the first mode), when the non-touch state continues for a certain time, the mode shifts to the first power-saving mode (the second mode) (Step S100-2), and the process returns to the processing at Step S100. If the non-touch state is present (Yes at Step S100), the first detection data (the detection value) Vd1 detected in the first touch detection period (the first period) TP is acquired (Step S101), and the first detection data (the detection value) Vd1 is updated as the first baseline data (the reference value) Vb1 for the first touch detection and is stored in the storage circuit 46 (Step S102).

The signal processor 44 determines whether the difference between the acquired first detection data (the detection value) Vd1 and the first baseline data (the reference value) Vb1 stored in the storage circuit 46 has exceeded the baseline threshold Vbth (|Vd1−Vb1|>Vbth) (Step S103).

If the difference between the first detection data (the detection value) Vd1 and the first baseline data (the reference value) Vb1 is baseline threshold Vbth (|Vd1−Vb1|≤Vbth) or less (No at Step S103), the signal processor 44 estimates the second baseline data (the reference value) Vb2 for the fingerprint detection and stores it in the storage circuit 46 (Step S104) and returns to the processing at Step S100. As described in the first modification, the second baseline data (the reference value) Vb2 for the fingerprint detection can be estimated by multiplying the first detection data (the detection value) Vd1 by the certain factor, for example. The processing at Step S100 is performed on the first power-saving mode (the second mode) including processing to estimate the second baseline data (the reference value) Vb2 (corresponding to Step S104 of the present processing), and the process may return to the processing at Step S100 without performing the processing at Step S104.

If the difference between the acquired first detection data (detection value) Vd1 and the first baseline data (the reference value) Vb1 has exceeded the baseline threshold Vbth (|Vd1−Vb1|>Vbth) (Yes at Step S103), the signal processor 44 sets the area in which the difference between the first detection data (detection value) Vd1 and the first baseline data (the reference value) Vb1 has exceeded the baseline threshold Vbth as the second detection area (the second area) DR2, sets divided areas within the second detection area (the second area) DR2 (e.g., the divided areas DR3 (the areas 1, 2, 3, . . . , 7, and 8) illustrated in FIG. 25) (Step S105), and outputs the set information to the detection controller 11.

The detection controller 11 shifts to the second power-saving mode (the third mode) illustrated in FIG. 26 and controls the parts of the detection device 1.

The signal processor 44 acquires the first detection data (the detection value) Vd1 detected in the first touch detection period (the first period) TP of the second power-saving mode (the third mode) and the second detection data (the detection value) Vd2 detected in each of the divided fingerprint detection periods (the second periods) FP1, FP2, . . . , FP8 (Step S106), updates the first detection data (the detection value) Vd1 as the first baseline data (the reference value) Vb1 for the first touch detection and stores it in the storage circuit 46 and updates the second detection data (the detection value) Vd2 as the second baseline data (the reference value) Vb2 for the fingerprint detection and stores it in the storage circuit 46 (Step S107), and returns to the processing at Step S100.

With this operation, like the third modification, even when the first detection data (the detection value) Vd1 detected in the first touch detection period (the first period) TP of the first power-saving mode (the second mode) significantly fluctuates, the second detection data (the detection value) Vd2 detected in the fingerprint detection period (the second period) FP of the second power-saving mode (the third mode) can be updated as the second baseline data (the reference value) Vb2 for the fingerprint detection, and the accuracy of the second baseline data (the reference value) Vb2 for the fingerprint detection can be improved. In addition, in the first power-saving mode (the second mode), the area in which the difference between the first detection data (the detection value) Vd1 and the first baseline data (the reference value) Vb1 fluctuates beyond the baseline threshold Vbth is set as the second detection area (the second area) DR2, whereby the second detection area (the second area) DR2 in the second power-saving mode (the third mode) can be narrowed compared with that of the third modification.

The present embodiment can obtain the detection device 1 that can perform the fingerprint detection at a freely-selected position within a detection area, on which touch detection is performed.

Fourth Embodiment

Figure 28:
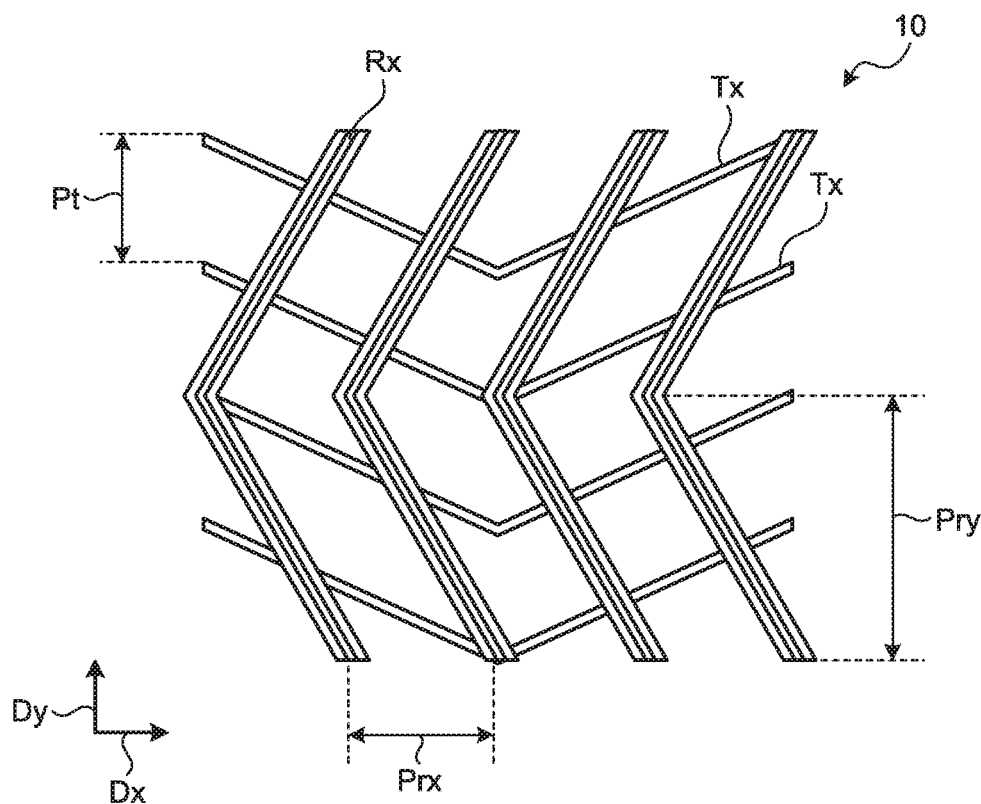
FIG. 28 is a plan view of a configuration example of the sensor according to a fourth embodiment.
Figure 29:
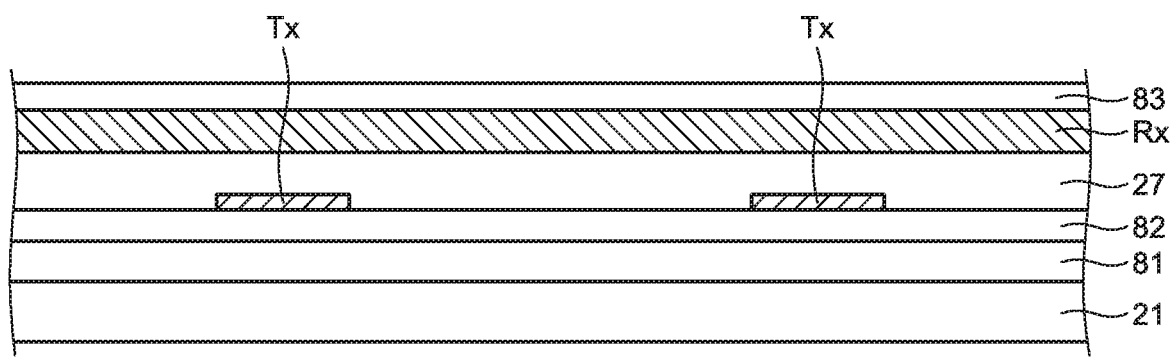
FIG. 29 is a sectional view of the configuration example of the sensor according to the fourth embodiment.

FIG. 28 is a plan view of a configuration example of the sensor according to a fourth embodiment. FIG. 29 is a sectional view of the configuration example of the sensor according to the fourth embodiment. As illustrated in FIG. 28, in the sensor 10 according to the fourth embodiment, the second electrode Tx includes one metallic thin line. For the material of the metallic thin line included in the second electrode Tx, aluminum, copper, silver, molybdenum, or an alloy of these is used. As illustrated in FIG. 29, the insulating resin layer 27 is provided between the second electrodes Tx and the first electrodes Rx. With this configuration, the first electrodes Rx and the second electrodes Tx are insulated from each other.

With this configuration, the sensor 10 can reduce the resistance of the second electrodes Tx. The sensor 10 can reduce the capacitance of the second electrodes Tx.

The preferred embodiments of the present disclosure have been described; the present disclosure is not limited to such embodiments. The details disclosed in the embodiments are only by way of example, and various modifications can be made without departing from the gist of the present disclosure. Appropriate modifications made without departing from the gist of the present disclosure also naturally belong to the technical scope of the present disclosure.

The present disclosure can also have the following configurations:

(1) A detection device comprising:
   a plurality of first electrodes provided in a first area and arranged in a first direction;
   a plurality of second electrodes provided in the first area and arranged in a second direction intersecting the first direction;
   a first electrode selection circuit configured to select the first electrodes;
   a second electrode selection circuit configured to select the second electrodes;
   a detector configured to detect a capacitance generated in the first electrodes or the second electrodes; and
   a controller configured to control the first electrode selection circuit, the second electrode selection circuit, and the detector, wherein
     the second electrode selection circuit is configured to:
     in a first period, simultaneously select the second electrodes provided in the first area; and
     in a second period, sequentially select the second electrodes provided in one of a plurality of third areas obtained by dividing a second area within the first area,
     the first electrode selection circuit is configured to:
     in the first period, simultaneously select the first electrodes within the first area and sequentially output a first detection signal corresponding to a capacitance change between the first electrodes and the second electrodes; and
     in the second period, sequentially select the first electrodes within the third area and output a second detection signal corresponding to a capacitance change between the first electrodes and the second electrodes in the second period, and
   the controller has at least the first period and the second period provided alternately.

(2) The detection device according to (1), wherein
   the controller is configured to detect a self-capacitance change generated in the first electrodes in the first area in a third period,
   the first electrode selection circuit is configured to simultaneously supply a third drive signal to the first electrodes within the first area in the third period and simultaneously output a third detection signal from the first electrodes within the first area in the third period, and
   the first period is provided in every predetermined period in which a plurality of the third periods are provided.

(3) The detection device according to (1), wherein
   the controller is configured to detect a self-capacitance change generated in the second electrodes in the first area in a third period,
   the second electrode selection circuit is configured to simultaneously supply a third drive signal to the second electrodes within the first area in the third period and simultaneously output a third detection signal from the second electrodes within the first area in the third period, and
   the first period is provided in every predetermined period in which a plurality of the third periods are provided.

(4) The detection device according to any one of (1) to (3), wherein the controller is configured to set a plurality of the second areas within the first area, output the second detection signal from one second area among the second areas, and then output the second detection signal from another second area.

(5) The detection device according to (2) or (3), wherein the controller has a first mode, in which at least the first period and the second period are alternately provided, and a second mode, in which the first period is provided in every predetermined period in which the third periods are provided.

(6) The detection device according to (5), wherein the detector is configured to set a detection value in the first period of the second mode as a reference value in the first period of the first mode.

(7) The detection device according to (5), wherein the detector is configured to estimate a reference value in the second period of the first mode based on a detection value in the first period of the second mode.

(8) The detection device according to any one of (5) to (7), wherein the controller has a third mode, in which the first period and the second period are provided in every predetermined period in which the third periods are provided.

(9) The detection device according to (8), wherein the detector is configured to set a detection value in the first period of the third mode as a reference value in the first period of the first mode.

(10) The detection device according to (8) or (9), wherein the detector is configured to set a detection value in the second period of the third mode as a reference value in the second period of the first mode.

(11) The detection device according to (8), wherein the detector is configured to:
   set a detection value in the first period of the second or the third mode as a reference value in the first period of the first mode; and
   when a difference between a detection value in the first period of the second mode and the reference value has exceeded a predetermined threshold, set a detection value in the second period of the third mode as a reference value in the second period of the first mode.

(12) The detection device according to (11), wherein the detector is configured to set a second area and a third area in the second period of the third mode including at least an area in which the difference between the detection value in the first period of the second mode and the reference value exceeds the predetermined threshold.

What is claimed is:
1. A detection device comprising:
   a plurality of first electrodes provided in a first area and arranged in a first direction;
   a plurality of second electrodes provided in the first area and arranged in a second direction intersecting the first direction;
   a first electrode selection circuit configured to select the first electrodes;
   a second electrode selection circuit configured to select the second electrodes;
   a detector configured to detect a capacitance generated in the first electrodes or the second electrodes; and a controller configured to control the first electrode selection circuit, the second electrode selection circuit, and the detector, wherein the second electrode selection circuit is configured to:
- in a first period, simultaneously select the second electrodes provided in the first area; and
- in a second period, sequentially select the second electrodes provided in one of a plurality of third areas obtained by dividing a second area within the first area, the first electrode selection circuit is configured to:
- in the first period, simultaneously select the first electrodes within the first area and sequentially output a first detection signal corresponding to a capacitance change between the first electrodes and the second electrodes; and
- in the second period, sequentially select the first electrodes within the third area and output a second detection signal corresponding to a capacitance change between the first electrodes and the second electrodes in the second period, the controller is configured to detect a self-capacitance change generated in the first electrodes or in the second electrodes, in the first area in a third period, the controller has:
- a first mode, in which at least the first period and the second period are provided alternately; and
- a second mode, in which the first period is provided in every predetermined period in which the third periods are provided, and the controller is configured to:
- determine whether the non-touch state is present in the first area, in the third period of the second mode;
- shift to the first mode, if the non-touch state is not present;
- shift to the second mode, when the non-touch state continues for a certain time in the first mode; and
- return to the determining whether the non-touch state is present in the first area, in the third period of the second mode.

2. The detection device according to claim 1, wherein
the controller is configured to detect a self-capacitance change generated in the first electrodes in the first area in the third period, and
the first electrode selection circuit is configured to simultaneously supply a third drive signal to the first electrodes within the first area in the third period and simultaneously output a third detection signal from the first electrodes within the first area in the third period.

3. The detection device according to claim 1, wherein
the controller is configured to detect a self-capacitance change generated in the second electrodes in the first area in the third period, and
the second electrode selection circuit is configured to simultaneously supply a third drive signal to the second electrodes within the first area in the third period and simultaneously output a third detection signal from the second electrodes within the first area in the third period.

4. The detection device according to claim 1, wherein the controller is configured to set a plurality of the second areas within the first area, output the second detection signal from one second area among the second areas, and then output the second detection signal from another second area.

5. The detection device according to claim 1, wherein the detector is configured to set a detection value in the first period of the second mode as a reference value in the first period of the first mode.

6. The detection device according to claim 1, wherein the detector is configured to estimate a reference value in the second period of the first mode based on a detection value in the first period of the second mode.

7. The detection device according to claim 1, wherein the controller has a third mode, in which the first period and the second period are provided in every predetermined period in which the third periods are provided.

8. The detection device according to claim 7, wherein the detector is configured to set a detection value in the first period of the third mode as a reference value in the first period of the first mode.

9. The detection device according to claim 7, wherein the detector is configured to set a detection value in the second period of the third mode as a reference value in the second period of the first mode.

10. The detection device according to claim 7, wherein the detector is configured to:
set a detection value in the first period of the second or the third mode as a reference value in the first period of the first mode; and
when a difference between a detection value in the first period of the second mode and the reference value has exceeded a predetermined threshold, set a detection value in the second period of the third mode as a reference value in the second period of the first mode.

11. The detection device according to claim 10, wherein the detector is configured to set a second area and a third area in the second period of the third mode including at least an area in which the difference between the detection value in the first period of the second mode and the reference value exceeds the predetermined threshold.

* * * * *